Jan. 18, 1966    W. J. SLOUGHTER ET AL    3,230,445
METHODS AND APPARATUS FOR INVESTIGATING EARTH FORMATIONS
UTILIZING WEIGHTING FACTORS VARIED AS A FUNCTION
OF A FORMATION CHARACTERISTIC
Filed June 15, 1960    8 Sheets-Sheet 1

William J. Sloughter
John H. Baker, Jr.
INVENTORS

BY Richard E. Bee
ATTORNEY

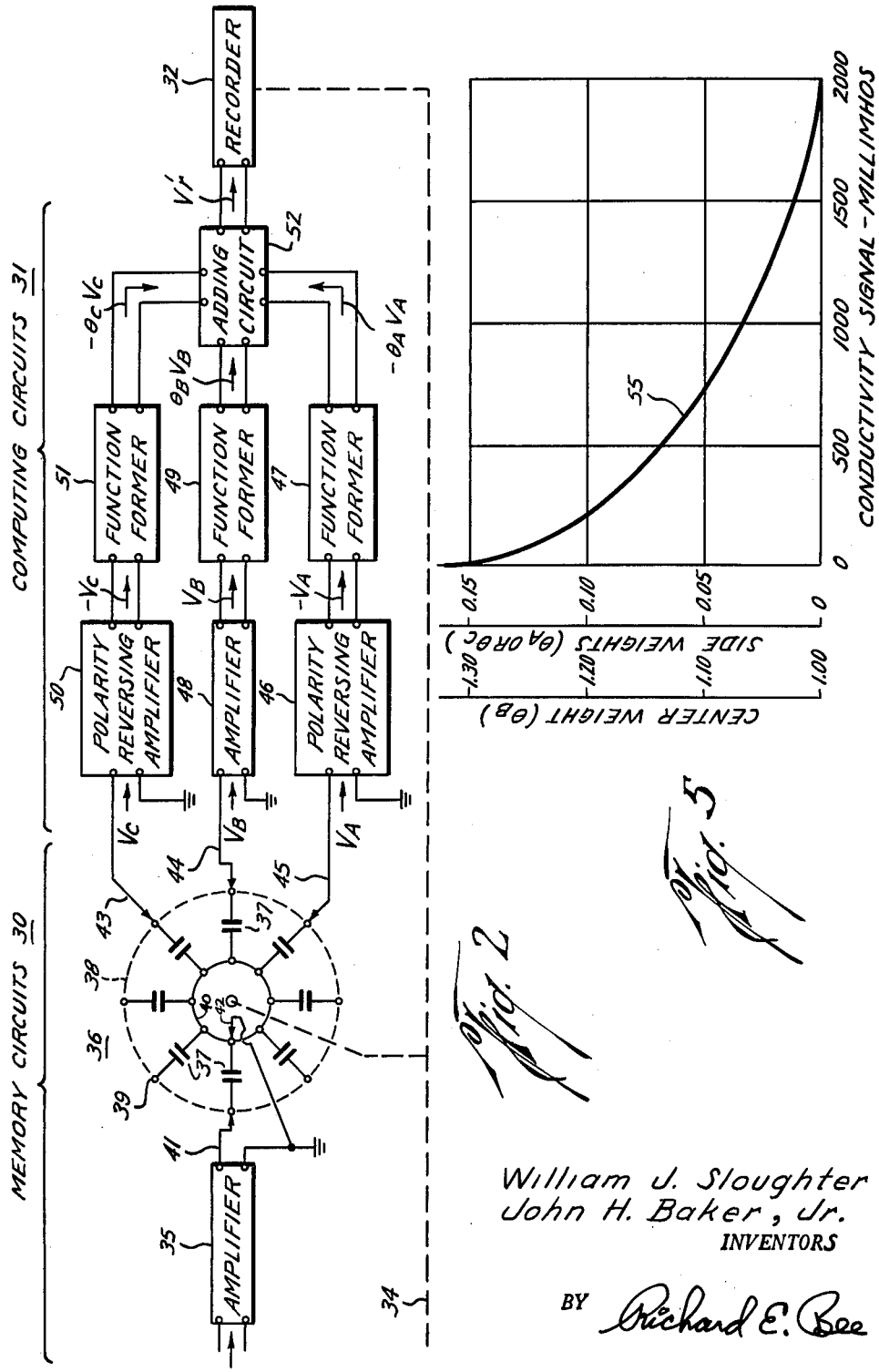

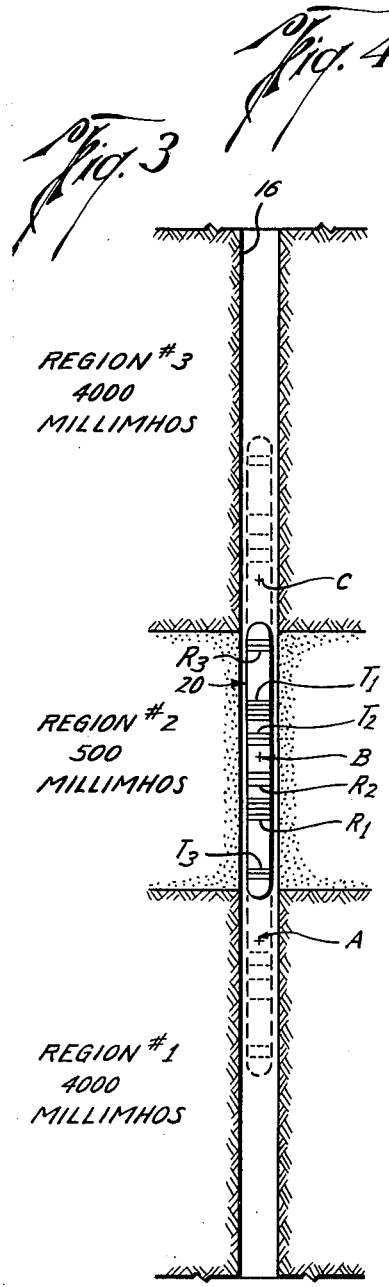
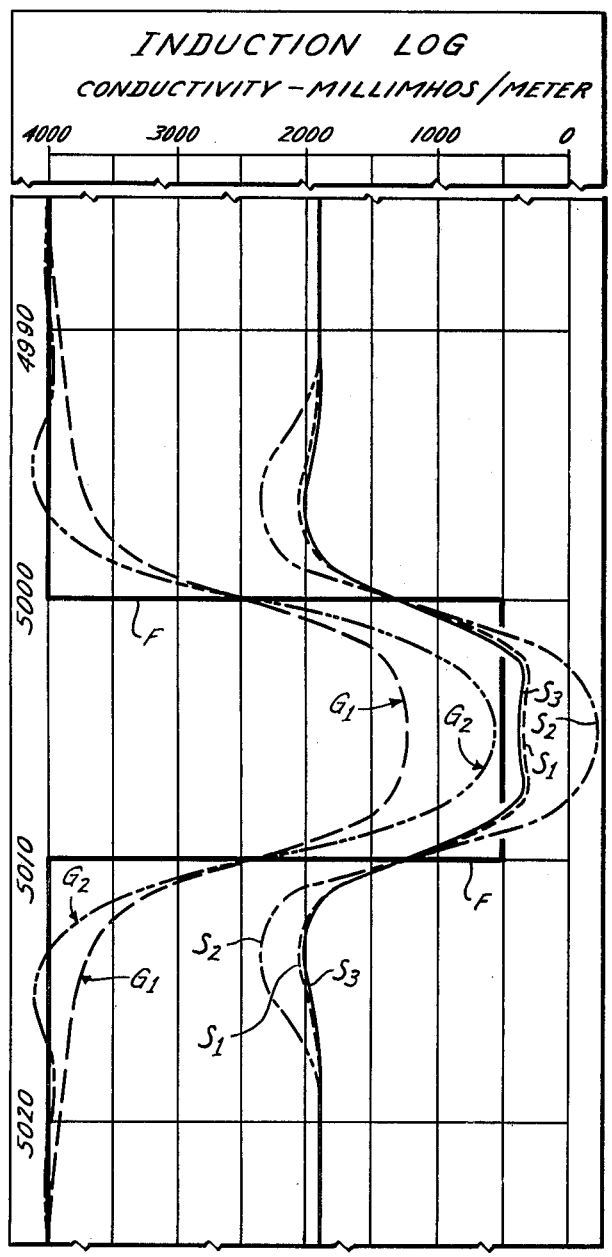

William J. Sloughter
John H. Baker, Jr.
INVENTORS

BY Richard E. Bee

ATTORNEY

William J. Sloughter
John H. Baker, Jr.
INVENTORS

BY Richard E. Bee
ATTORNEY

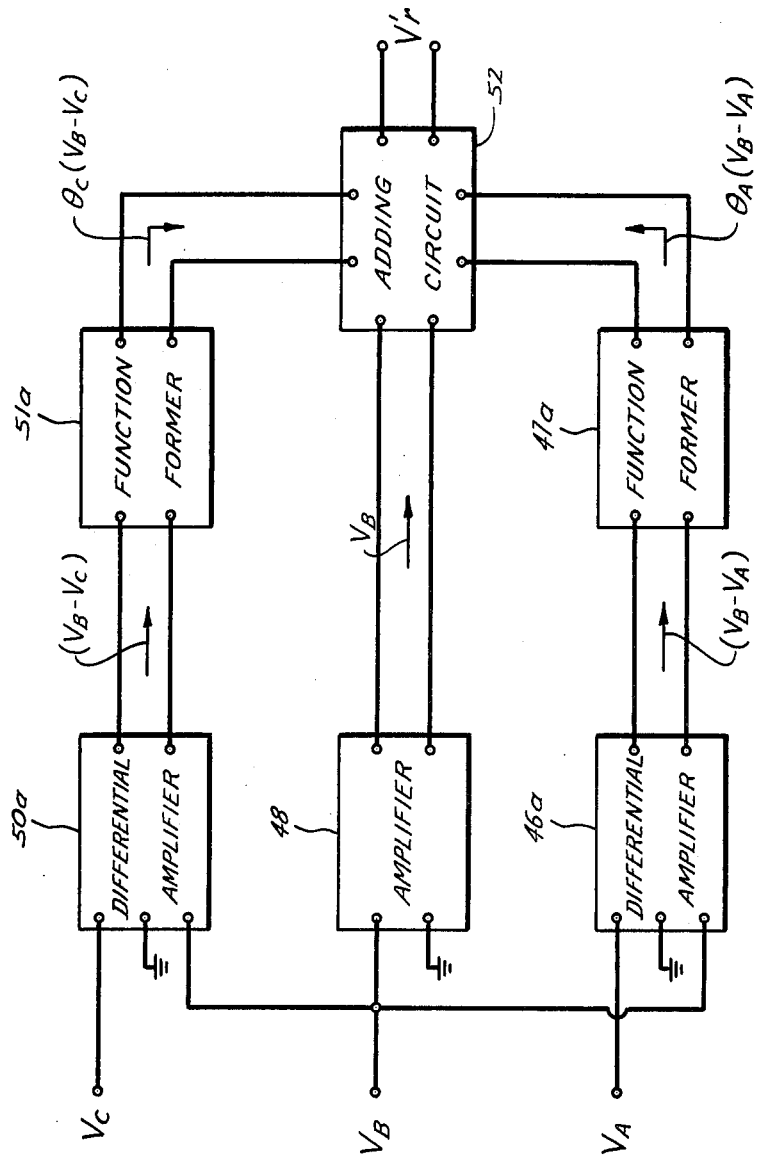

United States Patent Office 3,230,445
Patented Jan. 18, 1966

3,230,445
METHODS AND APPARATUS FOR INVESTIGATING EARTH FORMATIONS UTILIZING WEIGHTING FACTORS VARIED AS A FUNCTION OF A FORMATION CHARACTERISTIC
William J. Sloughter and John H. Baker, Jr., Houston, Tex., assignors to Schlumberger Well Surveying Corporation, Houston, Tex., a corporation of Texas
Filed June 15, 1960, Ser. No. 36,412
28 Claims. (Cl. 324—6)

This invention relates to borehole logging methods and apparatus for investigating subsurface earth formations penetrated by a borehole and, particularly, to such methods and apparatus wherein computer circuits are utilized to improve the results of the investigation.

In the logging of subsurface earth formations penetrated by a borehole, sensing apparatus is moved through the borehole to provide an output signal which varies in accordance with variations in a characteristic property of the formation material. For the case of electrical logging, for example, the output signal varies in accordance with the electrical resistivity or electrical conductivity of the subsurface formation material. In any case, it is often desirable that the sensing apparatus respond to only a relatively limited portion of the formation material which is adjacent the apparatus at any given instant. In particular, it is frequently desired that the vertical resolution of the sensing apparatus be such that the apparatus will respond to formation material only over a vertical interval of relatively narrow vertical extent. This enables relatively thin earth beds to be more readily distinguished and their characteristics more accurately measured.

As is frequently the case, the sensing apparatus tends to respond to a surrounding region of greater extent than is desired. A useful technique, however, has been devised for overcoming this tendency. This technique utilizes signals which are, at that instant, more representative of the formation material in the undesired regions to adjust or correct the signal which is, at the same instant, more representative of the desired region. This adjustment or correction is generally analogous to a process of mathematical computation. Consequently, it is conveniently referred to as a "computing" process. Also, the limiting of the response of a borehole sensing device to a region of relatively limited extent is commonly referred to as a "focussing" process. Consequently, the complete technique is conveniently referred to as a "computed focussing" process.

It has been found that when this "computed focussing" technique is applied to some types of logging apparatus, then, under certain conditions, further undesired effects occur which limit the usefulness of the technique under such conditions. This is better understood by considering a specific type of logging apparatus wherein this technique is particularly useful. One type of such apparatus is the so-called "induction logging" apparatus wherein a coil system is moved through the borehole to investigate the electrical resistance properties of the subsurface formations. It is generally desirable to improve the vertical resolution or vertical focussing of such induction logging apparatus without, at the same time, decreasing the depth of investigation of the apparatus in a horizontal or radial direction. The more common techniques for improving this vertical focussing have the disadvantage that they also tend to reduce the horizontal depth of investigation. It has been found, however, that this tendency can be overcome by utilizing the computed focussing technique for effectively improving the vertical focussing action. Thus, by means of this technique, improved induction logging apparatus has been constructed which has both a greater horizontal depth of investigation and also a high degree of vertical focussing.

While highly useful and much improved results have been obtained by means of such induction logging apparatus utilizing computed vertical focussing, extensive use of the apparatus under actual field conditions has indicated that under certain formation conditions the apparatus tends to become "over-focussed." Such overfocussing produces undesired spurious variations in the output signal of the apparatus. It has been found to occur in the vicinity of the boundary between two different earth beds where one of the beds has a relatively low value of electrical conductivity and the other has a relatively high value of electrical conductivity. A further study of the problem indicates that this over-focussing is caused by the occurrence of electrical skin effect phenomena in the formation material. This skin effect phenomena causes the induction logging output signal to become a nonlinear function of the formation conductivity, the degree of non-linearity increasing as the value of such conductivity increases. This tends to upset the computed focus because the signals from the undesired regions then become a function of the conductivity value of such regions as well as a function of the position of these regions relative to the logging apparatus. Of course, for conductivity values where this skin effect phenomena is not significant, the computed focussing process functions in the desired manner without introducing any appreciable spurious components in the vicinity of bed boundaries. It is, nevertheless, desirable to provide means for minimizing such spurious signal components in order that improved results may be obtained in those localities where extreme formation conditions are likely to be encountered.

It is an object of the invention, therefore, to provide new and improved borehole logging methods and apparatus for investigating the properties of earth formations penetrated by a borehole.

It is another object of the invention to provide new and improved borehole logging apparatus wherein the response of the logging apparatus is effectively improved by means of automatic computing apparatus.

It is a further object of the invention to provide new and improved electrical logging methods which minimizes undesired effects caused by the occurrence of electrical skin effect phenomena in the surrounding formation material.

It is an additional object of the invention to provide new and improved induction logging apparatus having computed vertical focussing with a minimum of "overfocussing" in the vicinity of boundaries between high and low conductivity formations.

In accordance with one feature of the present invention, a method of investigating earth formations traversed by a borehole comprises measuring a formation characteristic at different depths in the borehole. The method also includes adjusting at least one of these measurements as a nonlinear function of the formation characteristic. The method further includes combining these measurements, using in each case the adjusted measurement if one is available to provide an improved indication of the formation characteristic at a single one of the borehole depths.

In accordance with another feature of the present invention, apparatus is provided for use with a borehole logging system wherein a sensing system is moved through the borehole to develop signals representative of a characteristic of the adjacent formation material at different depths in the borehole. Such apparatus comprises means for translating these signals obtained at different borehole depths including means for applying different weighting factors to at least two of these signals during such translation and means for varying at least one of these weighing factors as a function of the formation characteristic in the vicinity of at least one of the depths corresponding to one of the signals being translated. The apparatus further includes means for combining these translated signals to develop a resultant signal providing an improved indication of the desired formation characteristic.

For a better understanding of the present invention, together with other and further objects thereof, reference is had to the following description taken in connection with the accompanying drawings, the scope of the invention being pointed out in the appended claims.

Referring to the drawings:

FIG. 1 schematically illustrates a representative embodiment of borehole induction logging apparatus constructed in accordance with the present invention;

FIG. 2 shows portions of the FIG. 1 apparatus in greater detail;

FIG. 3 illustrates a severe borehole situation that may be encountered by the logging apparatus;

FIG. 4 is a graph which illustrates various way in which the logging apparatus may respond to the borehole environment of FIG. 3;

FIGS. 5, 6 and 7 are graphs utilized in explaining the operation of the apparatus of FIGS. 1 and 2;

FIG. 13 shows another form of apparatus which may be used in place of a portion of the FIG. 2 apparatus.

Figure 1:
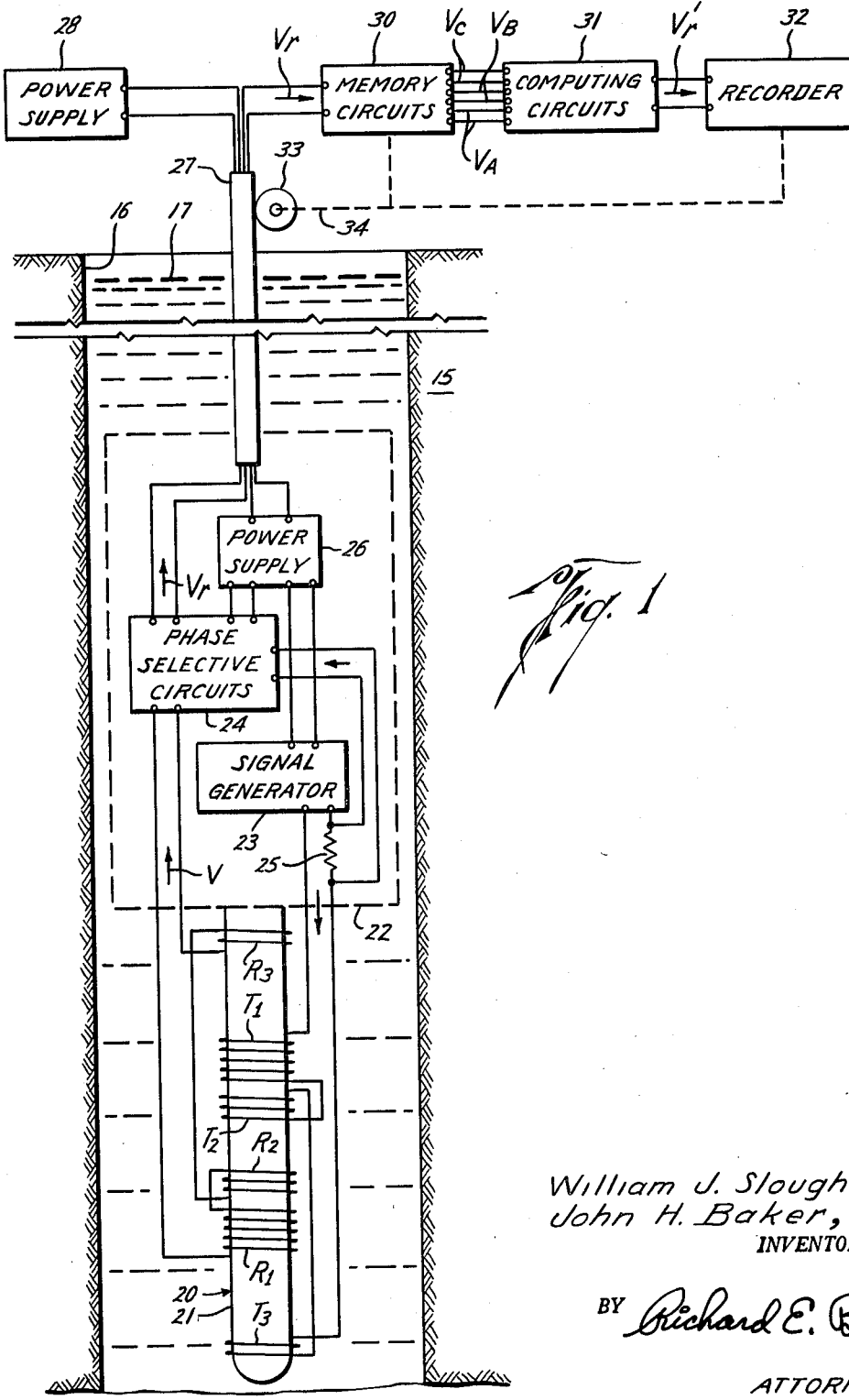

Referring to FIG. 1 of the drawings, there is shown a representative embodiment of a borehole logging system constructed in accordance with the present invention for investigating earth formations 15 traversed by a borehole 16. Borehole 16 is usually filled with a drilling liquid or drilling mud 17. The downhole portion of the logging system includes a sensing system or sensing means adapted for movement through the borehole 16 for developing, at any given instant, a signal which is representative of a characteristic of the formation material adjacent the sensing means at that instant. In the present embodiment, this sensing means comprises a coil system 20 for measuring the electrical conductivity of the adjacent formation material. This coil system includes an array of individual coils $T_1$, $T_2$, $T_3$, $R_1$, $R_2$ and $R_3$, each of which consists of one or more turns of conductive wire wound around an elongated, non-conductive, non-magnetic support member 21. Coils $T_1$, $T_2$ and $T_3$ constitute a set of transmitter coils connected in a series circuit relationship. Coils $T_2$ and $T_3$ are connected so as to be of opposite polarity to the $T_1$ coil. Coils $R_1$, $R_2$ and $R_3$ constitute a set of receiver coils connected in series with one another. The $R_2$ and $R_3$ receiver coils are connected so as to be opposite in polarity to the $R_1$ receiver coil.

One specific embodiment that has been found useful for such a coil system makes use of the following number of turns for the respective coils: sixty turns for $T_1$, fifteen turns for $T_2$, four turns for $T_3$, sixty turns for $R_1$, fifteen turns for $R_2$ and four turns for $R_3$. Reading from top to bottom, this embodiment uses the following vertical spacings between adjacent coil centers: 30, 10, 20, 10 and 30 inches. Thus, the overall vertical length of the coil array from the center of uppermost coil $R_3$ to the center of the lowermost coil $T_3$ is 100 inches.

The downhole sensing means of the present embodiment also includes suitable electrical circuits, contained in a fluid-tight instrument housing 22, for operating the coil array 20 to produce the desired output signal. This instrument housing 22 is secured to the upper end of the coil array support member 21. The electrical circuits within the instrument housing 22 include means, represented by a signal generator 23, for energizing the transmitter coils $T_1$, $T_2$ and $T_3$ with alternating current for developing in receiver coils $R_1$, $R_2$ and $R_3$ signals representative of the electrical conductivity of the adjacent formation material. The net alternating voltage signal "V" which appears across the series-connected receiver coils $R_1$, $R_2$ and $R_3$ is supplied to phase selective circuits 24 contained within the instrument housing 22. Also supplied to the phase selective circuits 24 is a phase reference signal developed across a resistor 25 which is connected in series between the signal generator 23 and the transmitter coils. Under the control of this phase reference signal, the phase selective circuits 24 operate to detect the magnitude of the component of net receiver coil voltage "V" which has the same phase angle as the transmitter coil current. Consequently, there is produced at the output of phase selective circuits 24 a unidirectional or direct-current type of signal "$V_r$" which is proportional in magnitude to the magnitude of the "in-phase" component of the net receiver coil signal. Also contained within the instrument housing 22 is a power supply 26 for supplying the appropriate operating potentials to the signal generator 23 and the phase selective circuits 24.

The downhole portion of the logging system including the coil array 20 and the instrument housing 22 is suspended from the surface of the earth by means of an armored, multi-conductor cable 27. A suitable drum and winch mechanism (not shown) is located at the surface of the earth of winding and unwinding this cable 27. In this manner, the coil system is moved through the borehole 16 to develop signals representative of the formation conductivity at different depths in the borehole 16. The individual insulated conductors contained within the armored cable 27 serve to establish electrical communication between the downhole and surface portions of the logging apparatus. In particular, a pair of these conductors serve to connect a power supply 28 located at the surface of the earth to the downhole power supply 26 for energizing such downhole power supply 26.

The surface portion of the logging system of the present embodiment also includes signal translating means for weighting and combining the $V_r$ signals obtained at different borehole depths by the downhole portion of the system. This signal translating means is represented in a general manner in FIG. 1 by memory circuits 30 and computing circuits 31. The input side of memory circuits 30 is connected to the output terminals of the downhole phase selective circuits 24 by means of a second pair of conductors contained within the cable 27. The surface apparatus also includes means, represented by a recorder 32, for providing indications of the resultant $V_r'$ signals appearing at the output of computing circuits 31. The operation of memory circuits 30 and recorder 32 is synchronized with the movement of the downhole portion of the logging system through the borehole 16. This synchronization is provided by means of a mechanical measuring wheel 33 which is rotated by movement of the cable 27 along the periphery thereof. The measuring wheel 33 is coupled to the memory circuits 30 and the recorder 32 by means of a suitable linkage indicated schematically by dash-line 34.

Referring now to FIG. 2 of the drawings, there is shown in greater detail the signal translating means represented by memory circuits 30 and computing circuits 31 of FIG. 1. As seen in FIG. 2, this signal translating means includes a plurality of signal channels for translating the $V_r$ coil system signals obtained at different depths in the borehole 16. The exact number of signal channels is determined by the number of borehole depths which it is desired to consider at any given instant in order to obtain a computed signal for a single given borehole depth. In the present embodiment, three different borehole depths are considered at each instant and, consequently, the corresponding signal translating means includes three signal channels. Each of these signal channels includes signal delay means for producing at the output ends of the different signal channels simultaneous occurrence of signal portions corresponding to different depths in the borehole. These signal channels also include means for applying different weighting factors to the signals translated by the different channels and means for varying these weighting factors as a function of the formation characteristic in the vicinity of at least one of the depths corresponding to one of the signals being weighted.

The signal delay means of the present embodiment includes memory circuit means coupled to the receiver coils $R_1$, $R_2$ and $R_3$ and synchronized with the movement of the coil system 20 through the borehole 16 for producing at different memory circuit output terminals the simultaneous occurrence of signal portions corresponding to different depths in the borehole 16. This memory circuit means is represented by memory circuits 30. It includes an amplifier 35 and a capacitor-type memory system 36. The input side of amplifier 35 is connected to the downhole coil system by way of the appropriate cable conductors, while the output side of such amplifier is connected to the memory system 36. Amplifier 35 serves to amplify the unidirectional $V_r$ signals produced by the downhole apparatus.

Memory system 36 includes a number of condensers 37 mounted on a rotatable non-conductive member 38. One end of each of condensers 37 is connected to an outer contact point 39, the other end of each condenser being connected to a common ring-like inner conductor 40. Rotation of the non-conductive member 38 is controlled by the movement of the downhole coil system through the borehole by means of the linkage indicated schematically by dash-line 34. In other words, this linkage 34 produces rotation of the member 38 which is in step with the vertical movement of the coil system through the borehole, the speed of rotation being proportional to the rate of movement of the coil system.

Contact arms 41 and 42 serve to place on each condenser a voltage charge corresponding to the unidirectional potential appearing at the output of amplifier 35 at the instant the outer contact point 39 for that condenser is in physical contact with the arm 41. Thus, as the coil system moves through the borehole, successive samples of the unidirectional $V_r$ signal are placed on different ones of the condensers 37 as they move past the contact arm 41. The amplifier 35 is constructed to provide a relatively low output impedance so that the condensers 37 will rapidly charge to the potential level of the contact arm 41. This also enables rapid readjustment of the voltage or charge on a condenser as it comes back around to the contact arm 41 for a second time. In this manner, it is seen that the memory system 36 serves to make available at any given instant the $V_r$ signal values obtained over a desired vertical interval of the borehole 16.

By means of three output contact arms 43, 44 and 45, there is obtained at any given instant of time, three voltage signals $V_A$, $V_B$ and $V_C$ corresponding to three different depths in the borehole 16. Assuming that the member 38 rotates in a clockwise manner as the coil system moves in an upwardly direction through the borehole 16, then, at any given instant, the $V_A$ signal corresponds to a lower borehole depth, the $V_B$ signal to a center borehole depth and the $V_C$ signal to an upper borehole depth.

The separation or spacing between the borehole depth levels corresponding to these signals is determined by the relative locations of the contact arms 43, 44 and 45 around the periphery of member 38, the diameter of member 38 and the effective gear ratio intermediate measuring wheel 33 and member 38. In the present example, these factors are chosen so as to provide signals corresponding to borehole depth levels spaced 80 inches apart.

In practice, a greater number of condensers would be used in the memory system 36 than is shown in the simplified schematic representation of FIG. 2. Also, other forms of memory systems may be used in place of the one shown in FIG. 2. Some of such alternative forms are described in copending application Serial No. 807,221, filed April 17, 1959, now Patent No. 3,166,709, in the name of H. G. Doll. In particular, a set of non-rotating condensers together with a multiple-contact stepping relay for selectively charging and sampling the condensers has been found to provide a useful and readily-constructed form of memory system. A memory system of this latter type is described in detail in copending application Serial No. 807,213, filed April 17, 1959, in the name of W. J. Sloughter.

The signal weighting and signal combining portions of the FIG. 2 signal translating means include the signal channel portions provided by the computing circuits 31. Considering first the lower or $V_A$ signal channel, such channel includes polarity-reversing means represented by a polarity reversing amplifier 46 which is connected to memory system contact arm 45. Amplifier 46 is, in turn, coupled to a non-linear function former circuit means represented by a function former 47. Function former 47 serves to apply a weighting factor to the signal being translated by this channel and to vary this weighting factor as a function of the amplitude of such $V_A$ signal.

The center or $V_B$ signal channel includes an amplifier 48 of a type which does not reverse the polarity of the signal supplied thereto by the memory system contact arm 44. This amplifier 48 is coupled to a nonlinear function former 49 which serves to apply a weighting factor to the $V_B$ signal and to vary this weighting factor as a function of the amplitude of such $V_B$ signal.

The upper or $V_C$ signal channel includes a polarity reversing amplifier 50 coupled to a nonlinear function former 51, the latter serving to apply a weighting factor to the $V_C$ signal and to vary this weighting factor as a function of the amplitude of such $V_C$ signal.

With respect to amplifiers 46, 48 and 50, in particular, it is to be understood that the term "amplifier" includes the case of a circuit or device which has a voltage, current or power gain greater than unity. For example, a cathode follower circuit, which usually has a voltage gain of less than unity and a power gain greater than unity, would be classed as an amplifier for present purposes. With respect to function formers 47, 49 and 51, each of these function formers may be of the diode type wherein one or more bias diodes is utilized to control the input-output signal transfer characteristic of the function former as a function of the input signal level.

The $V_A$, $V_B$ and $V_C$ signal channels each terminate in an adding circuit 52. Adding circuit 52 constitutes means for combining the weighted signals supplied by the function formers 47, 49, and 51 for developing a resultant output signal $V_r'$ which provides an improved indication of the desired formation conductivity characteristics. This resultant signal $V_r'$ is then supplied to the recorder 32 to provide a permanent record thereof as a function of the depth of the coil system in the borehole.

Considering now the operating of the apparatus thus far described, as the downhole coil system including the coil array 20 and the instrument housing 22 is moved through the borehole, signal generator 23 operates to energize the series-connected transmitter coils $T_1$, $T_2$ and $T_3$ with alternating current. This produces an alternating electromagnetic flux field in the formation material adjacent the transmitter coils. This flux field, in turn, induces a secondary current flow within the formation material itself. The magnitude of this secondary current flow is generally proportional to the electrical conductivity of the formation material. This secondary current flow induces voltage components in the receiver coils $R_1$, $R_2$ and $R_3$.

The net voltage signal "V" induced across these receiver coils is then supplied to the phase selective circuits 24. Under the control of the phase reference signal developed across resistor 25, such phase selective circuits 24 serve to develop a unidirectional or direct-current type of output signal "$V_r$" which is proportional to the component of the net voltage "V" which is in phase with the transmitter coil current flowing through the resistor 25. This $V_r$ output signal is proportional to the resistive component of the secondary current flow in the formation material or, more precisely, it is, in the absence of any appreciable skin effect, directly proportional to the conductivity of the formation material. As the coil system moves through the borehole, the $V_r$ output signal varies as the conductivity of the adjacent formation material varies.

In order to improve the vertical resolution of the coil system so that it may more accurately measure the conductivity of relatively thin earth beds, the specific coil system shown in FIG. 1 includes more than one transmitter coil and more than one receiver coil. To understand how the use of additional coils serve to improve the vertical focussing or vertical resolution of the coil system, reference is had to FIG. 3 of the drawings which illustrates a possible borehole situation. As shown in FIG. 3, region No. 2 denotes a relatively thin center bed having a conductivity of 500 millimhos per meter. This center bed is bounded both above and below by shoulder regions, denoted as regions No. 1 and No. 3, each having a conductivity of 4,000 millimhos per meter. This particular sequence and magnitude of conductivity values represents a particularly severe situation for the coil system to measure. For the moment, however, we are not concerned with the severity of the situation. The present purpose is to show how the use of additional coils serves to improve the vertical focussing characteristic of the system.

To this end, it is assumed that the coil array 20 is at position B, that is, centered in the center bed denoted as region No. 2. This position is denoted by the solid line representation of the coil system in FIG. 3. In this position, the main coils $T_1$ and $R_1$ serve to develop a signal which is primarily representative of the conductivity of the center region, namely, region No. 2. Nevertheless, some of the electromagnetic flux field associated with this $T_1$–$R_1$ coil pair produces secondary current flow in the shoulder regions No. 1 and No. 3. These shoulder currents, in turn, induce corresponding, but undesired, voltage components in the primary receiver coil $R_1$. In order to offset these undesired shoulder components, the additional coils, principally the outer two coils $R_3$ and $T_3$, are utilized to produce opposite polarity voltage components which are more representative of the secondary currents in the shoulder regions than in the center region. As a result of the series-opposing connections of the coils, the opposite-polarity shoulder-representative components are caused to cancel one another and the coil system is, thus, caused to have a substantially reduced net response to the shoulder regions.

As is the nature of things, however, the reduction of the shoulder response also tends to reduce the response from portions of center region No. 2, which lie at a relatively large horizontal distance from the center axis of the borehole. This latter tendence is undesirable in that it impairs the ability of the system to measure the true or natural conductivity of the center region, particularly for those cases where some of the drilling fluid contained in the borehole has invaded laterally an appreciable distance into the center bed. In order to prevent any substantial reduction in the lateral depth of response of the coil system, this particular coil system is actually not as well focussed in the vertical direction as is theoretically possible. In other words, the specific coil system being considered is only partially focussed in the vertical direction in order to provide a relatively deep response in a horizontal direction. This may be deducted from the values given hereinbefore for the numbers of turns on the various coils. In particular, it is noted, that the outer two coils $T_3$ and $R_3$, which are the more effective in cancelling the undesired shoulder signal components, have relatively few turns compared to the main $T_1$ and $R_1$ coils.

To see the effect that the lack of complete vertical focussing would have on the record or log produced by recorder 32 if such recorder were to record directly and without change the $V_r$ output signal developed by the downhole coil system, reference is had to FIG. 4 of the drawings. FIG. 4 illustrates a portion of a typical record or log corresponding to the formation interval depicted in FIG. 3. The vertical scale of the FIG. 4 log is plotted interms of depth in the borehole, while the horizontal scale is plotted in terms of formation conductivity. The heavy solid line curve, denoted as curve F, indicates the actual or true value of the formation conductivity as a function of depth. Curve $G_1$, on the other hand, denotes the apparent conductivity indication provided by the unmodified $V_r$ signal as the coil array 20 is moved through the borehole interval of FIG. 3, provided that no appreciable electrical skin effect phenomena takes place within the formation material. Such skin effect phenomena will, of course, be present and, hence, curve $G_1$ is strictly theoretical in nature and would not be obtained in actual practice. Nevertheless, it is useful for present purposes to compare curve $G_1$ with curve F because the differences in these curves corresponds to the type of results that would be obtained under less severe formation conditions. Also, in a somewhat different sense, a comparison of curves F and $G_1$ is useful in showing only the effect of incomplete vertical focussing without the added complication of electrical skin effect considerations.

As is shown by curve $G_1$, the lack of complete vertical focussing causes an undesirable increase in the reading obtained at the center of the center bed. This results from the additional voltage components produced by the secondary currents in the shoulder regions. Also, curve $G_1$ shows the lingering or residual effect of the center region conductivity on the resultant reading as the coil array moves into the shoulder region. In other words, curve $G_1$ requires a substantial time to reach the full shoulder conductivity value after the midpoint of the coil array moves into the shoulder region. Note that the borehole depth for any given voltage reading is taken as being the depth of the midpoint of the coil array at that instant.

In order to obtain more nearly complete vertical focussing, the computed focussing process is utilized. For the present embodiment, three voltage readings are taken at three different depths in the borehole to enable the computation of a corrected reading for a single depth in the borehole. More particularly, these voltage readings are taken at three successive depth levels in borehole with the vertical spacing between these levels being 80 inches. Thus, the apparatus of the present embodiment may be said to have three "computing stations" denoted as A, B and C. Station B corresponds to the actual midpoint of the coil array, while stations A and C correspond to points which are respectively 80 inches below and 80 inches above the actual midpoint of the coil array. These computing levels or computing stations are thus fixed with respect to the coil array. Their positions relative to the earth formations, however, are continuously changing as the coil array moves through the borehole. The symmetry of the present embodiment causes the borehole depth for the corrected reading to coincide with the borehole depth of station B, i.e., the borehole depth of the midpoint of the coil array. Thus, in the present embodiment, voltage readings obtained 80 inches above and 80 inches below the coil array midpoint are combined with the voltage reading taken at the coil array midpoint to provide a corrected or computed reading for the coil array midpoint.

FIG. 3 shows the positions of computing stations A, B and C for obtaining a computed reading for the borehole depth corresponding to the center of region No. 2. For this case, the reading at station B is the $V_r$ voltage reading obtained when the midpoint of the coil array is located at the center of region No. 2. The reading for station A is the $V_r$ voltage reading which is obtained when the midpoint of the coil array is 80 inches below the center of region No. 2. The reading for station C is the $V_r$ voltage reading which is obtained when the midpoint of the coil array is 80 inches above the center of region No. 2.

The voltage reading obtained at station B in FIG. 3 is primarily representative of the conductivity of region No. 2. It does, however, also include undesired voltage components determined by the conductivities of shoulder regions No. 1 and No. 3. The voltage readings obtained at stations A and B, on the other hand, are primarily representative of the conductivities of shoulder regions No. 1 and No. 3, respectively. Consequently, if the proper fractions of the voltage readings obtained at stations A and C are subtracted from the voltage reading obtained at station B, then the contribution of these shoulder regions is effectively removed from the resultant reading for station B. In other words, it is desired to obtain a resultant signal for station B which is described by the relationship:

$$V'_r = -\theta_A V_A + \theta_B V_B - \theta_C V_C \qquad (1)$$

where $V_A$, $V_B$ and $V_C$ denote the voltage readings or signals obtained at stations A, B and C, respectively; $\theta_A$, $\theta_B$ and $\theta_C$ are weighting factors which denote the relative fractions of these signals which are combined with one another; and $V'_r$ denotes the resultant computed signal which it is desired to record.

For the present, it is still being considered that electrical skin effect phenomena is not taking place to a significant degree within the formation material. Consequently, it is possible to determine a fixed set of values for the weighting factors, $\theta_A$, $\theta_B$ and $\theta_C$ which will provide an optimum degree of vertical focussing. For the specific coil system being considered and for the case of three computing stations spaced 80 inches apart, the following weighting factors have been found to provide such optimum vertical focussing:

$$\begin{aligned}\theta &= 0.16 \\ \theta &= 1.32 \\ \theta &= 0.16\end{aligned} \qquad (2)$$

These weighting factors take into account the partial vertical focussing provided by the coil array itself.

The fixed weighting factors of Equation 2 also satisfy the relation:

$$-\theta_A + \theta_B - \theta_C = 1 \qquad (3)$$

This causes the modified $V'_r$ signal to have the same value as the unmodified $V_r$ signal when the coil system is investigating an extended vertical interval of uniform conductivity. Such an interval represents a homogeneous formation condition, at least in a vertical sense. The satisfying of Equation 3 also means that the overall scale factor for the system will not be altered by the presence of the computing apparatus.

The manner of determining the numerical values for these fixed weighting factors $\theta_A$, $\theta_B$ and $\theta_C$ is discussed in detail in the above-mentioned Doll application Serial No. 807,221. This copending Doll application also gives the general procedure for determining the fixed weighting factors for any coil system with any number of computing stations.

Assuming for the moment, that the function formers 47, 49 and 51 of the FIG. 2 apparatus, are replaced by circuits for providing the fixed weighting factors indicated by Equation 2, then the apparatus of FIG. 2 would provide the fixed-weight computed focussing just discussed. More specifically, as the coil system moves through the borehole, the $V_r$ voltage readings obtained at successive borehole depths are stored on successive ones of the condensers 37 as these condensers move past the contact arm 41. Shortly thereafter, three of these voltage signals simultaneously appear at the three output contact arms 43, 44 and 45 to provide the desired $V_A$, $V_B$ and $V_C$ input signals for the computing circuits 31. The $V_B$ signal represents the desired signal containing undesired components, while the $V_A$ and $V_C$ signals represent voltage readings taken 80 inches below and 80 inches above the depth for the $V_B$ signal. The polarity reversing amplifiers 46 and 50 in the $V_A$ and $V_C$ signal channels then operate to provide negative replicas of the $V_A$ and $V_C$ signals, the $V_B$ signal at the same time being translated without change of polarity by the amplifier 48. The fixed-weight weighting circuits assumed to be replacing the function formers 47 and 51 in the $V_A$ and $V_C$ signal channels then operate to apply the $\theta_A$ and $\theta_C$ weighting factors to their respective signals. In the present case, the $\theta_A$ and $\theta_C$ weighting factors are of the same value. At the same time, the $\theta_B$ weighting factor is applied to the $V_B$ signal by the fixed-weight weighting circuit assumed to be replacing the function former 49 in the $V_B$ channel. The resulting weighted signals are then algebraically added by the adding circuit 52 to provide a resultant output signal $V'_r$ in accordance with Equation 1. This resultant signal is then supplied to the recorder 32 which then records the value of such signal as the conductivity value at the borehole depth corresponding to station B.

While it is convenient to think of these weighting factors as being applied at specific points in each channel, this need not necessarily be the case. The only basic requirement is that the relative signal gain (or loss) factors in the three signal channels be adjusted so as to provide the requisite increase or decrease in signal gain corresponding to the desired weights for the respective signals. Note also that the computing process is continuous in nature so that as the coil system moves through the borehole 16, the borehole depth for the three computing stations A, B and C is continually changing. Also, the corresponding voltage signals $V_A$, $V_B$ and $V_C$ are subject to change if the conductivity of the adjacent formation changes.

The resulting log that would be produced for the FIG. 3 borehole interval by this fixed-weight computing process is indicated by curve $G_2$ of FIG. 4. It is again assumed that the electrical skin effect phenomena is not present. This curve shows that the computed signal $V'_r$ gives a much more accurate indication of the true conductivity of region No. 2, the center region. Also, as the coil system moves into the adjacent shoulder region, the corresponding output signal provides a better and quicker indication of the conductivity of such shoulder region. The differences between curves $G_1$ and $G_2$ shows the nature of the improvement that can be obtained in the present embodiment by computed vertical focussing with fixed computing weights. This type of improvement is, in fact, obtained for those formation conditions where electrical skin effect phenomena in the formation material is not significant.

At first glance, it would appear that the vertical focussing provided by the computer circuits is much the same as the vertical focussing provided by the use of additional coils in the coil system. This, however, is not the case. The use of additional coils tends to reduce the horizontal depth of investigation. This tendency does not occur with the computing circuits. This is because the use of additional coils eliminates the deep horizontal data before any signal indications can be measured. With the computing circuits, however, each of the input signals supplied thereto still contains the deep horizontal data. Consequently, in subtracting the shoulder data from the center bed data, only the undesired shoulder component of the center bed signal is cancelled, leaving the deep horizontal center bed component substantially intact.

A primary purpose of the present invention is to provide computed focussing apparatus which takes into account the occurrence of the electrical skin effect phenomena in the formation material under severe borehole conditions. Accordingly, the effect of this electrical skin effect phenomena on the operation of the logging system will now be considered. At the onset, it is noted that the 4,000 millimho conductivity values for the shoulder regions No. 1 and No. 3 of FIG. 3 constitute relatively high conductivity values wherein such skin effect phenomena become quite significant. If now the unmodified $V_r$ signal developed by the coil system is recorded by the recorder 32 directly and without any computation, then the results for the borehole interval of FIG. 3 are indicated by curve $S_1$ of FIG. 4. The first thing that is noted is that the occurrence of electrical skin effect generally causes the recorded conductivity values to be less than the actual conductivity values. This is a nonlinear phenomena with the percentage error increasing as the value of the formation conductivity increases. In particular, it is noted that the peak error for the shoulder regions is much greater than the peak error for the center region.

If the computed vertical focussing process utilizing the fixed computing weights given in Equation 2 is employed, then the resulting log for the FIG. 3 borehole interval is indicated by curve $S_2$ of FIG. 4. For the severe borehole situation being considered where a center bed of relatively low conductivity is surrounded by shoulder regions of relatively high conductivity, a comparison of curves $S_1$ and $S_2$ shows the fixed-weight computed focussing of curve $S_2$, is, in several respects, inferior to the $S_1$ curve obtained without any computed focussing. In particular, curve $S_2$ shows a negative value for the center bed conductivity which, for conventional recording apparatus, would mean that the recorder trace would be off scale.

This erroneous indication for the center bed results from a so-called "over focussing" caused by the computing circuits. More particularly, it results from not taking into account the occurrence of electrical skin effect phenomena in the computing process. What happens is that a large degree of skin effect in the highly conductive shoulder regions causes a substantial reduction in the contribution of such shoulder regions to the voltage reading taken at the center of the center bed. At the same time, the two voltage readings taken at stations A and C in FIG. 3 are much less affected by the skin effect phenomena in the shoulder region. This is because at stations A and C the voltage readings are largely determined by the electromagnetic flux field closely adjacent to the borehole, which portion of the flux field is not as greatly affected by skin effect. At station B, however, the larger portion of the electromagnetic flux field lying in the shoulder regions is located at greater horizontal distances from the borehole. Consequently, such shoulder portions of the flux field are much more affected by the ocurrence of the skin effect phenomena in the shoulder region. Thus, the voltage readings for stations A and C, which are intended to cancel the shoulder region contribution to the voltage reading at station B, are now disproportionally larger than such shoulder region contribution to the station B reading. Consequently, when these shoulder signals are weighted and combined by the computing circuits, the negative $V_A$ and $V_C$ components are too large. This causes the resultant signal to become negative. In other words, the computing apparatus has overcompensated or over-focussed the resultant signal.

Another undesired feature of this over-focussing is the relatively large extraneous humps in the $S_2$ curve just before and just after the coil system enters and leaves the center bed.

Assuming that the shoulder regions No. 1 and No. 3 extend for a substantial vertical distance, then when the coil system has moved a sufficient distance into these shoulder regions so that substantially homogeneous conditions prevail, there are no further indications of this undesired over-focussing effect. The skin effect error then takes the form of a fixed and steady error of known magnitude. In other words, the undesired introduction of spurious signal components presently being considered is a phenomena which occurs chiefly in the vicinity of boundaries between earth formation regions having substantially different conductivity values where the conductivity on one side of the boundary is relatively high. In the absence of such spuriors over-focussing components, the coil system signal can be modified to correct for the electrical skin effect phenomena. Apparatus for producing this skin effect correction will be discussed in connection with FIG. 12. For present purposes, it is sufficient to state that such skin effect correction will remove the steady skin effect error which is present after the coil system has moved a substantial distance into the shoulder region and away from the bed boundaries. In terms of the FIG. 4 curves, it would shift the higher conductivity portions of the $S_1$ and $S_2$ curves so that the portions lying outside of the central 4990–5020 feet interval would coincide with the desired 4,000 millimho line. At the same time, the lower conductivity portions corresponding to the region No. 2 center bed would remain substantially as shown. This type of skin effect correction will not, however, compensate for the spurious variations introduced in the vicinity of the bed boundaries.

In accordance with a principal feature of the present invention, means are provided for minimizing or substantially eliminating the spurious over-focussing variations which tend to occur in the vicinity of bed boundaries. Basically, this result is obtained by reducing the computing weights when the coil system is in the vicinity of a bed boundary region having a relatively high conductivity value.

For the specific coil array and the specific three-station computing process being considered, the manner in which these $\theta_A$, $\theta_B$ and $\theta_C$ weighting factors should be reduced as the formation conductivity increases is indicated by the graph of FIG. 5. The horizontal axis of FIG. 5 is plotted in terms of the $V_r$ signal values supplied by the downhole coil system to the surface apparatus. For convenience, these signal values are expressed in terms of conductivity instead of volts. The relationship between conductivity and voltage is a fixed proportionality constant, the actual value of which depends on the physical construction of the downhole portion of the system. The horizontal axis of FIG. 5 is, therefore, plotted in terms of the apparent conductivities measured by the coil system. These apparent conductivities are not necessarily equal to the true formation conductivities, particularly where the electrical skin effect is significant. For example, the 2,000 milllimho point along the horizontal axis of FIG. 5 would, in the case of a homogeneous formation, correspond to a true formation conductivity of approximately 4,000 millimhos. The difference arises from the steady erron introduced by the occurrence of the electrical skin effect phenomena.

The vertical axis of FIG. 5 includes scale calibrations for both the center channel weighting factor $\theta_B$ and the side channel weighting factors $\theta_A$ and $\theta_C$. It is noted that the relationship between the center channel weight $\theta_B$ and the side channel weights $\theta_A$ and $\theta_C$ given for the vertical axis of FIG. 5 are such as to satisfy Equation 3. This preserves the original overall scale factor for the system.

Curve 55 of the FIG. 5 graph indicates the manner in which the weighting factors for the various signal channels of FIG. 2 should be varied as a function of the signal amplitudes in the respective channels to minimize the occurrence of the undesired over-focussing components. The end point on curve 55 for a conductivity signal value of zero is determined by the optimum fixed weighting factors given in Equation 2. The end point for the other end of curve 55 is determined by ascertaining the formation conductivity value at which the formation skin effect phenomena becomes so substantial that the shoulder region contribution to the coil system signal when the coil array is centered in the center bed is negligible. In this case, it is desired that the computing process be discontinued. This, in turn, requires a center weight of unity and side weights of zero. In most cases, this upper conductivity limit will be on the order of 4,000 millimhos. This corresponds to a coil system apparent conductivity signal of approximately 2,000 millimhos for the upper and lower computing stations.

A desired number of intermediate points on curve 55 may be determined either experimentally or by mathematical computation. In the first place, it is known that curve 55 should decrease in some orderly manner from its maximum value at the left of FIG. 5 to its minimum value at the right side of FIG. 5. This results from a realization of the fact that the occurrence of electrical skin effect aids the vertical focussing of the coil system. Consequently, as the magnitude of the skin effect increases, the amount of focussing provided by the computer circuits should be correspondingly reduced to prevent over-focussing. It is known that the magnitude of this skin effect phenomena increases in a nonlinear manner as the value of the formation conductivity increases. Accordingly, the computing weights should decrease in a nonlinear manner as the formation conductivity increases. A consideration of the relationship between formation skin effect and formation conductivity will thus provide a first approximation as to the location of such intermediate points on curve 55. This relationship is discussed in detail in copending application Serial No. 34,825, filed June 8, 1960, in the name of W. P. Schneider. In some cases, this rough approximation, alone, will afford a substantial improvement in minimizing the undesired over-focussing components.

For FIG. 5, selected intermediate points on curve 55 were determined in a more precise manner by means of mathematical computation. To facilitate such computations, it is assumed that a bed situation of the type shown in FIG. 3 exists and that the coil array is centered in the center bed. It is further assumed that the center bed has a conductivity value of zero while the shoulder regions are assumed to have a conductivity value corresponding to a desired intermediate point on curve 55. This assumption of zero conductivity for the center bed means that the coil system output signal in this case results solely from the secondary currents in the shoulder regions. The resulting coil system output signal is then calculated for various assumed sets of weighting factor values corresponding to different ordinate levels in FIG. 5. The selection of these sets of values is aided by the approximation just mentioned. More particularly, for each assumed set of weighting factors, the resulting coil system output signal is calculated for various values of center bed thickness which range from a minimum corresponding to the spacing between the main transmitter and receiver coils $T_1$ and $R_1$ up to a maximum which is slightly greater than the overall distance between the lowermost and uppermost coils for the lower and upper computing stations, respectively. In calculating these shoulder signals, the effect of the electrical skin effect phenomena in reducing the magnitude of these signals is taken into account. In this manner, a family of curves is obtained which enables the selection of an optimum set of computing weights for the assumed shoulder conductivity value. This then provides one intermediate point on curve 55. Additional intermediate points are determined in a similar manner for other assumed shoulder conductivity values. A smooth curve is then drawn through these points to provide the results indicated by curve 55 of FIG. 5.

In order to minimize the undesired over-focussing components, the function formers 47, 49 and 51 of FIG. 2 are constructed to reduce the weighting factors in the respective signal channels in accordance with curve 55 of FIG. 5. The requisite input-output signal transfer characteristic for function former 49 of the center or $V_B$ signal channel is indicated by curve 56 of FIG. 6. Curve 56 is obtained from the data of FIG. 5 by plotting input signal values against the product of these input signal values times the corresponding $\theta_B$ weighting factors obtained from FIG. 5. The input-output characteristic of curve 56 may be accurately approximated by three straight-line segments corresponding to the three input signal intervals $m_0$, $m_1$, and $m_2$. Thus, the initial gain of function former 49 is set to provide the desired input-output signal ratio corresponding to the straight line approximation over the $m_0$ interval, while a first function former diode determines the input-output ratio over the $m_1$ interval and a second function former diode determines the input-output ratio over the $m_2$ interval. Note that the present apparatus is concerned with direct-current signal gain factors. The direct-current signal gain for any point on curve 56 is determined by the input-output signal ratio for that point and not by the slope of the curve at such point. A straight line segment, of course, denotes a fixed direct-current gain factor over the interval of such segment.

Figure 6:
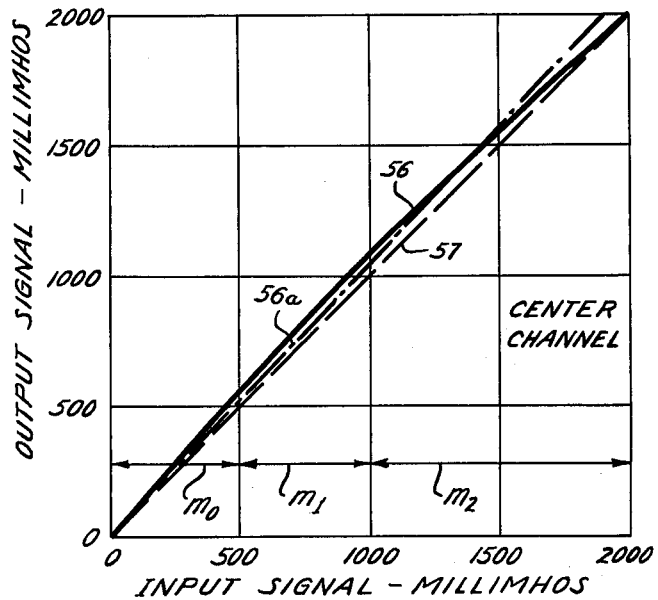

It is noted that curve 56 does not depart very greatly from the unity-gain line indicated by dash-line 57 of FIG. 6. Accordingly, for many purposes, sufficient accuracy can be obtained by utilizing a single linear approximation as indicated by line 56a of FIG. 6. The input-output signal ratio along line 56a represents a fixed signal gain factor slightly greater than unity. This minimizes the maximum departure of the output signal from the ideal value indicated by curve 56. To realize this fixed gain approximation, the function former 49 would be replaced by a fixed gain circuit having a relative gain factor as indicated by the input-output ratio for line 56a. If the coil system is being used in a locality where the maximum apparent conductivity likely to be encountered is substantially less than the maximum 2,000 millimho value of FIG. 6, then this fixed gain may be adjusted to provide a more accurate approximation of a correspondingly restricted portion of curve 56.

Figure 7:
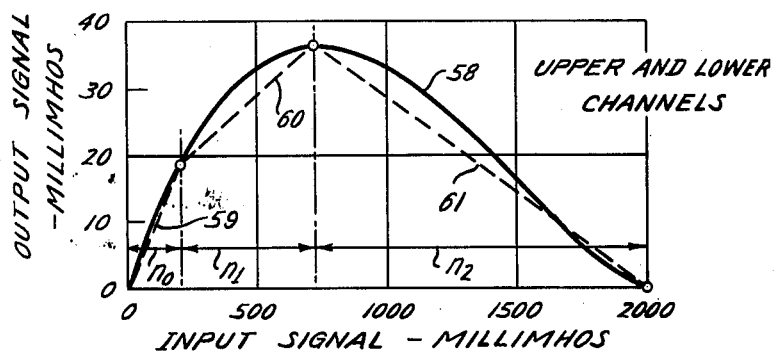

The input-output signal transfer characteristics for the function formers 47 and 51 in the lower and upper signal channels are identical to one another and are indicated by curve 58 of FIG. 7. The data for curve 58 is obtained from FIG. 5 by multiplying each conductivity signal value by its corresponding side channel weighting factor to obtain the corresponding output signal value. It is noted from FIG. 7 that the maximum signal that will be contributed by either of the upper and lower channels will be a little less than 40 millimhos. Accordingly, sufficient accuracy for most purposes can be obtained by causing the side channel function formers 47 and 51 to provide the approximation of curve 58 indicated by the three straight-line segments 59, 60 and 61 of FIG. 7. The straight-line segment 59, corresponding to the input signal interval $n_0$, is provided by the initial gain setting of the function former. The signal gain indicated by the straight-line segment 60 is provided by a first function former diode, while the signal gain for the straight-line segment 61 is provided by a second function former diode. If greater accuracy is required, additional function former diodes may be utilized so that curve 58 is more closely approximated. In particular, the use of a different type of coil array or a different selection of computing stations may require a closer degree of approximation.

With the function former 49 in the center channel constructed to provide the signal transfer characteristic indicated by curve 56 of FIG. 6 and with the function formers 47 and 51 in the two side channels each constructed to provide the signal transfer characteristic indicated by the curve 58 of FIG. 7, then these three function formers will provide adjustable signal gain (or loss) factors which change in accordance with the signal levels supplied to their respective inputs. This automatically provides the desired adjustment of the $\theta_A$, $\theta_B$ and $\theta_C$ weighting factors in accordance with curve 55 of FIG. 5. The resultant weighted components appearing at the outputs of the function formers 47, 49 and 51 are then algebraically added by the adding circuit 52 to provide the desired computed focus signal $V'_r$. This computed signal is then recorded by recorder 32.

The resulting log obtained for the FIG. 3 borehole interval where the computing weights are varied in accordance with FIG. 5 is indicated by solid line curve $S_3$ of FIG. 4. It is noted that this curve represents only a minor improvement over the broken line curve $S_1$ which was obtained for the case where no computing was utilized. It does, on the other hand, represent a substantial improvement over the $S_2$ curve which was obtained when fixed computing weights were utilized. This is the expected result because, as indicated by curve 55 of FIG. 5, the function formers 47, 49 and 51 operate to effectively reduce the amount of computation as the value of the formation conductivity increases. Conversely, for less severe borehole conditions, the computing weights are increased to increase the benefits of computed focussing.

An additional advantage which results from the use of variable computing weights is that the apparatus as a whole is less sensitive to variations in the thickness of the center bed. This, of course, is not apparent from FIG. 4 which depicts the situation for only a single center bed thickness. This reduced sensitivity to variations in bed thickness is realized because the accompanying changes in the apparent conductivities seen by the upper and lower computing stations produce an adjustment of the weighting factors in the side channels which largely offsets such changes.

Figure 8:
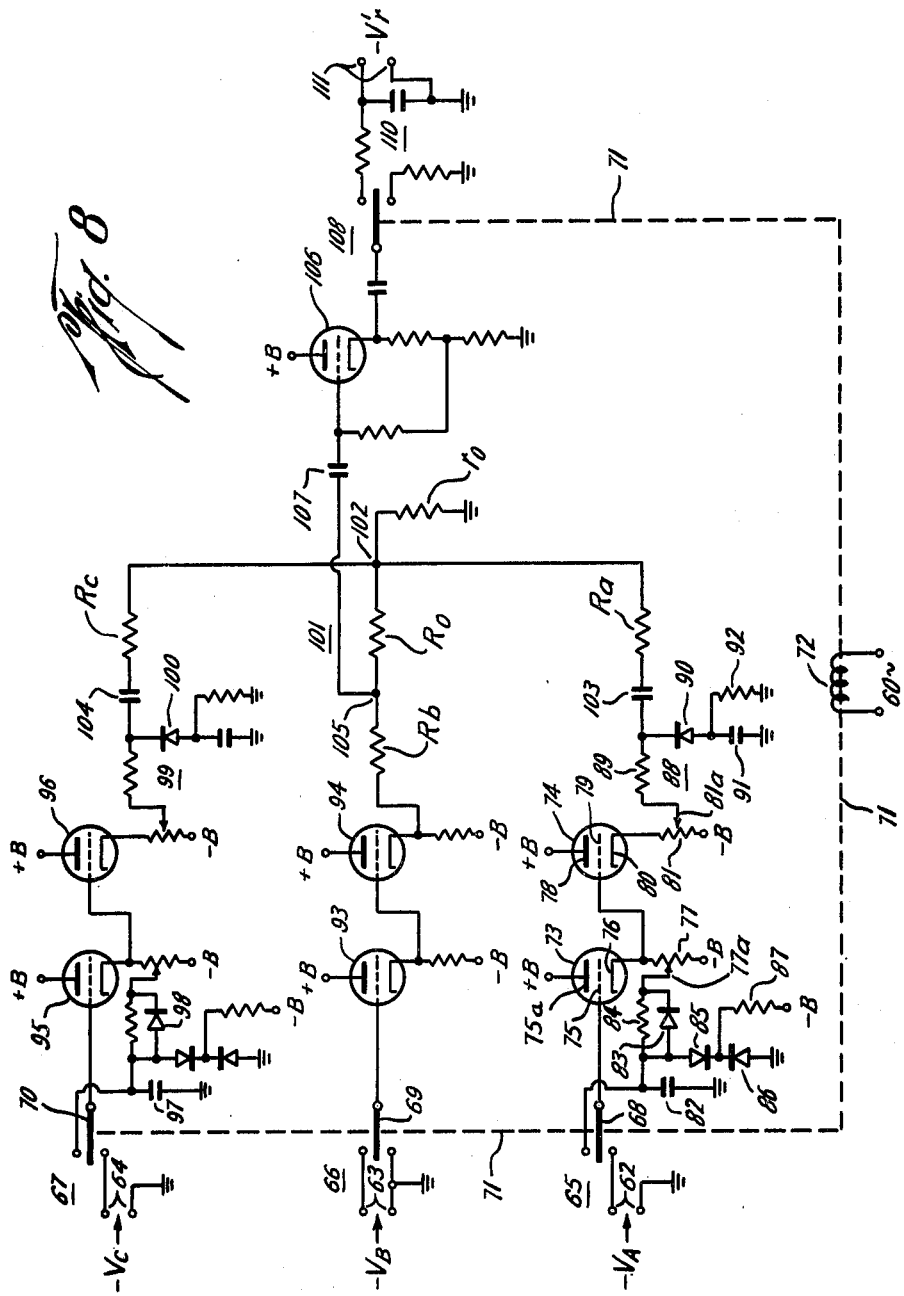
FIG. 8 is a circuit diagram of a modified embodiment of a portion of the FIG. 2 apparatus.

Referring now to FIG. 8 of the drawings, there is shown a modified form of weighting and combining apparatus which may be used in place of the computing circuits 31 of FIGS. 1 and 2. In general, this modified weighting and combining apparatus of FIG. 8 provides a fixed weighting factor for the center or $V_B$ signal channel, while providing for independent adjustment of the weighting factors in the $V_A$ and $V_C$ side channels as a function of their respective signal amplitudes. For this embodiment, it is assumed that negative polarity unidirectional signals are developed by the downhole coil system and supplied by the memory circuits to the input terminals of the present FIG. 8 apparatus. There are thus supplied to the input terminals 62, 63 and 64 of the three signal channels of the FIG. 8 apparatus negative polarity unidirectional signals $V_A$, $V_B$ and $V_C$ corresponding to the borehole depths of the three computing stations A, B and C. These three signals are then supplied to the polarity reversing means which, in the present embodiment, includes electro-mechanical vibrators or "choppers" 65, 66 and 67. The vibrating contact arms 68, 69 and 70 of these choppers 65, 66 and 67 are adapted to move in synchronism with one another as indicated schematically by dash-line 71. Operation of these contact arms 68, 69 and 70 is provided by a relay coil 72 which is energized by a suitable alternating-current source. Thus, contact arms 68, 69 and 70 are continuously moving back and forth between their upper and lower contact points at a rate determined by the frequency of the alternating current supplied to the relay coil 72. As will be seen, the relative polarity of the connections between the chopper contacts and the input terminals 62, 63 and 64 provides the correct relative signal polarities for the various signal channels.

Considering first the details of the initial portion of the lower or $V_A$ signal channel, such channel includes function former type signal translating means comprising a pair of electron tubes 73 and 74 coupled in cascade. Each of these tubes is connected so as to provide in each case a cathode follower circuit. Thus, an anode 75a of tube 73 is connected to a source of operating potential +B.

A grid electrode 75 of tube 73 is connected to the chopper arm 68, while a cathode 76 is connected to a source of negative potential—B by way of a cathode resistor 77. Tube 24, on the other hand, includes an anode 78, a grid electrode 79 and a cathode 80. Anode 78 is connected to a source of potential +B, while cathode 80 is connected by way of a cathode resistor 81 to a potential source —B. Grid electrode 79 is connected to the cathode 76 of the first tube stage.

This function former circuit which includes tubes 73 and 74 further includes a storage condenser 82 having one side thereof connected to a point of relatively fixed reference potential, namely, ground, for supplying a reference signal level which initially corresponds to such ground level. The function former circuit also includes switching means, represented by the chopper 65, for alternately connecting the grid electrode 75 of the cathode follower tube 73 to one of the signal input terminals 62 and to the storage condenser 82 for developing both alternating-current and direct-current signal components, each of which is proportional to the $V_A$ input signal.

The signal translating means represented by the cathode follower portions of the function former circuit being considered further includes diode circuit means responsive to the direct-current signal component for altering the alternating-current signal translating characteristics of such signal translating means in a predetermined manner with respect to the input signal amplitude. In the present embodiment, such diode circuit means appears in two somewhat different forms. In one form, this diode circuit means includes a diode device 83 connected between a cathode follower output terminal, namely the cathode 76 of tube 73, and the upper side of the storage condenser 82 for charging condenser 82 to a potential level proportional to the peak direct-current level of the cathode 76 whenever the direct-current level lies within a predetermined range of values. This function former circuit also includes means for maintaining the upper side of the storage condenser 82 at a reference potential level whenever the direct-current level at the cathode 76 lies outside of the predetermined range of values. This latter circuit means comprises a biasing network which includes a resistor 84 shunting the diode device 83, a pair of additional diode devices 85 and 86 connected in a series opposing manner between the upper side of condenser 82 and ground, and a resistor 87 connected between the two diodes 85 and 86 and a point of negative potential —B.

The other form which the diode circuit means of the present function former may take is represented by a diode network 88 connected to the cathode resistor 81 of the second cathode follower stage associated with tube 74. This diode network 88 includes a series resistor 89, a diode device 90, and a condenser 91 and resistor 92 connecting the lower side of the diode device 90 to ground.

The initial portion of the center or $V_B$ signal channel includes a pair of electron tubes 93 and 94, each connected to provide a cathode follower circuit with the two circuits connected in cascade. No function former diodes are associated with these cathode follower stages because it is desired that the signal weighting in the center channel should remain fixed as the signal level varies.

The initial portion of the upper or $V_C$ signal channel includes a nonlinear function former circuit for modifying the amplitude of the $V_C$ signal as a function of such signal amplitude. This function former circuit is identical in construction to that previously discussed for the lower or $V_A$ signal channel and, hence, need not be discussed in detail. Briefly, it includes a pair of cathode follower circuits associated with electron tubes 95 and 96, these two circuits being connected in cascade. A storage condenser 97 supplies the reference signal level for the first stage while a diode device 98 serves to control the alternating-current signal gain for this stage. A diode network 99 connected to the output side of the second tube 96 serves to provide the remaining adjustment of the alternating-current signal gain, such adjustment being controlled by a diode device 100.

The initial portions of each of the three $V_A$, $V_B$ and $V_C$ signal channels terminate in a common resistor adding network 101 which serves to combine the three $V_A$, $V_B$ and $V_C$ signals to develop the desired output signal. This resistor adding network 101 includes three resistance branches or paths having separate input ends adapted to receive the individual $V_A$, $V_B$ and $V_C$ signals. Their output ends are connected to a common junction 102. The resistance branch for the $V_A$ signal includes a resistor $R_a$, this resistor being coupled to the diode network 88 by means of a direct-current blocking condenser 103. The resistance branch for the $V_B$ signal channel includes resistors $R_b$ and $R_0$ connected in series between the cathode of tube 94 and the common junction point 102. The resistance branch of the $V_C$ signal channel includes a resistor $R_c$ connected to the diode network 99 by way of a direct-current blocking condenser 104. The resistor adding network 101 further includes a resistor $r_0$ connected between the common junction 102 and a point of fixed reference potential corresponding, in this case, to ground.

The resistor adding network 101 further includes output circuit means connected to an intermediate point 105 along the resistance branch for the $V_B$ channel. In the present embodiment, this output circuit means includes a cathode follower circuit associated with an electron tube 106 for further translating the net alternating component appearing at the junction point 105. This cathode follower circuit associated with tube 106 is coupled to the junction point 105 by means of a condenser 107 which passes only the alternating-current components appearing at such junction point. The resultant alternating-current signal appearing at the output side of the cathode follower tube 106 is then supplied to an output chopper unit 108 which operates in synchronism with the previously-mentioned input chopper units 65, 66 and 67. This output chopper 108 serves to convert the resultant alternating-current signal into a direct-current type of signal. The resulting direct-current signal is then passed by way of a low-pass filter 110 to output terminals 111 of the FIG. 8 apparatus. Filter 110 serves to remove any high frequency transients present in the resulting output signal so that a smoothly varying unidirectional signal is provided. This unidirectional signal, denoted as $V'_r$, is then supplied to the recorder 32 as shown in FIGS. 1 and 2.

Considering now the operation of the FIG. 8 apparatus, such apparatus is constructed to apply a fixed weighting factor to the $V_B$ signal and to apply to the $V_A$ and $V_C$ signals weighting factors which are automatically adjusted in accordance with the amplitudes of the $V_A$ and $V_C$ signals. It shall initially be assumed that the function former diodes, namely, diodes 83 and 90 in the $V_A$ channel and diodes 98 and 100 in the $V_C$ channel, are non-conductive. In this initial condition, the overall direct-current signal gain factors between each of the three input terminals 62, 63 and 64 and the pair of common output terminals 111 are adjusted so that the relative weights accorded the three signals correspond to the appropriate portions of the signal transfer characteristics of FIGS. 6 and 7. In particular, the overall signal gain for the $V_B$ signal is selected to provide the fixed gain represented by the input-output signal ratio for line 56a of FIG. 6. The initial overall signal gains for the $V_A$ and $V_C$ signals are the same and are selected in accordance with the signal ratio for straight-line segment 59 of FIG. 7. For simplicity, it will be assumed that this initial relative weighting is provided by the resistor adding network 101. It will be noted, however, that any relative differences in the initial signal gains of the initial portions of each signal channel are to be taken into account in providing the initial weighting factors.

Considering now the function former circuit for the lower or $V_A$ signal channel and the manner in which it operates to adjust the $\theta_A$ weighting factor applied to the $V_A$ signal, it is initially assumed that diodes 83 and 90 are non-conductive. Circuitwise, this is accomplished for the case of zero input signal because the direct-current potential levels at tap points 77a and 81a are more positive than the potential levels on the other or anode sides of diodes 83 and 90. With the diode 83 non-conductive, the bias network represented by resistor 84, diodes 85 and 86 and resistor 87 operates to maintain the upper side of condenser 82 at a value of zero volts. The upper side of condenser 82 is connected to the upper contact of chopper 65. The negative $V_A$ signal appearing at the input terminals 62 is connected to the lower contact of chopper 65. Consequently, as the chopper arm 68 vibrates back and forth between the upper and lower chopper contacts, a chopped replica of the $V_A$ signal is applied to the grid 75 of tube 73. This grid signal is represented by waveform H of FIG. 9A. The corresponding cathode signal appearing at tap point 77a on cathode resistor 77 is represented by waveform I of FIG. 9B. It is noted that the average direct-current level at point 77a is changed from its zero input signal value $E_0$ to a new valve $V_{dc}$ by the occurrence of the $V_A$ input signal. This new value $V_{dc}$ is, however, still of positive polarity and, hence, diode 83 remains in a non-conductive condition. Thus, for small values of the $V_A$ input signal, the cathode follower stage associated with tube 73 operates in the usual manner to reproduce the chopped $V_A$ signal at the cathode 76 thereof with the signal gain being slightly less than unity.

Figure 9:
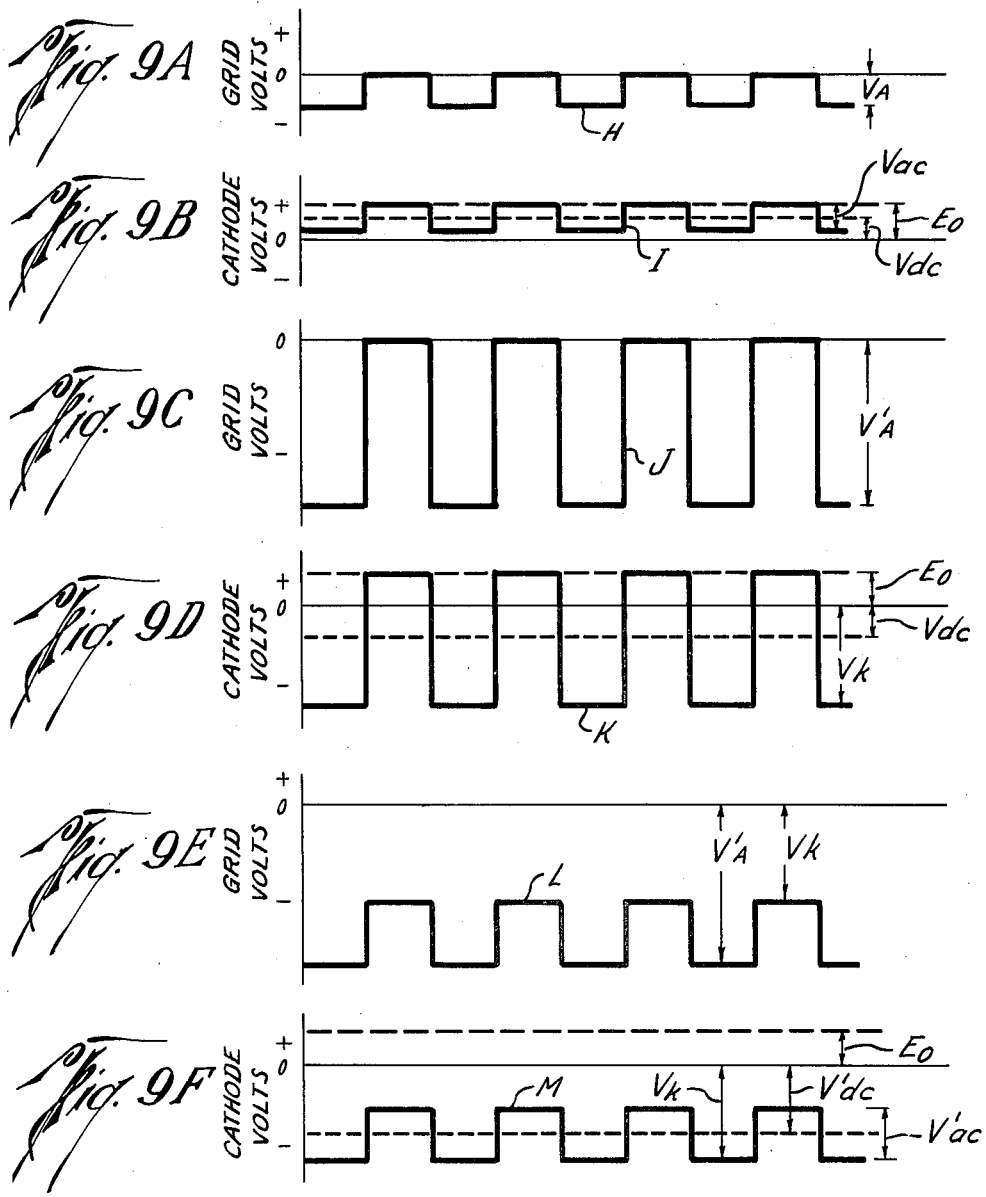
FIGS. 9A–9F are waveform graphs used in explaining the operation of the FIG. 8 apparatus.

If now the $V_A$ input signal assumes a much larger value, denoted as $V_A'$, and if the diode 83 is considered for the moment to remain non-conductive, then the resulting signal at grid 75 is indicated by waveform J of FIG. 9C. The corresponding signal at cathode tap point 77a is indicated by waveform K of FIG. 9D. Note that the average direct-current level $V_{dc}$ is now of negative polarity. This causes the function former diode 83 to become conductive. It also renders the biasing network diode 85 non-conductive. Consequently, condenser 82 now charges up to a potential level corresponding to the peak negative value $V_k$ appearing at point 77a. With condenser 82 charged to a negative value $V_k$, the signal at grid 75 will alternate back and forth between the input signal level $V_A'$ and the voltage level on condenser 82, namely, $V_k$. This resultant signal at grid 75 is indicated by waveform L of FIG. 9E. The corresponding cathode signal at tap point 77a is indicated by waveform M of FIG. 9F. Both the amplitude $V_{ac}'$ of the alternating-current component indicated by waveform M and the direct-current voltage level $V_{dc}'$ appearing at tap point 77a are proportional to the amplitude of the input signal supplied to input terminal 62. It is thus seen that the direct-current component of the chopped $V_A$ signal serves to control the operation of function former diode 83 to reduce the effective alternating-current signal gain for the first cathode follower stage whenever the $V_A$ input signal exceeds a predetermined value. This is because the potential feedback by way of condenser 82 when diode 83 is conductive reduces the net alternating-current variation at the grid 75. The circuit is constructed so that this reduced signal gain causes the overall signal gain for the $V_A$ signal to correspond to the input-output signal ratio for the straight line segment 60 of FIG. 7. Adjustment of the tap point 77a serves to set the breakpoint intermediate segments 59 and 60 of FIG. 7.

The signal, including both alternating-current and direct-current components, appearing at cathode 76 is supplied to the second cathode follower stage associated with tube 74. These signal components at cathode 76 are proportional to the corresponding values at the tap point 77a.

Cathode follower tube 74 operates to reproduce these signal components across its cathode resistor 81. A selected fraction of these components is then supplied by way of tap point 81a and resistor 89 to the function former diode 90 located in the diode network 88. The direct-current component of this signal serves to initiate conduction in the diode 90 whenever such component becomes sufficiently negative so as to cancel the steady-state positive potential appearing at tap point 81a when no input signal is applied. The beginning of conduction in the diode 90 corresponds to the breakpoint between straight-line segments 60 and 61 of FIG. 7. Such breakpoint may be adjusted by adjusting tap point 81a. As the signal components continue to increase, conduction in the diode 90 increases. This, in turn, increases the alternating-current voltage drop across resistor 89. A point is eventually reached where the alternating-current signal appearing at the junction of resistor 89 and diode 90 is reduced to a negligible value. In this manner, diode network 88 operates to reduce the alternating-current signal amplitude in accordance with straight-line segment 61 of FIG. 7.

It is seen from the foregoing that diodes 83 and 90 serve to modify the signal gain characteristics of the cathode follower circuits so that the gain for the alternating-current component is adjusted as a function of the input signal amplitude in accordance with FIG. 7. The alternating-current component of the resulting signal appearing at the junction between resistor 89 and diode 90 is then passed by a condenser 103 to the resistor adding network 101.

The $V_B$ signal supplied to the center signal channel is translated by the cathode follower circuits associated with tubes 93 and 94 to a second input terminal of the resistor adding network 101. It is noted that the input signal is supplied to the chopper 66 in such a manner that the resulting signal supplied to the adding network 101 is 180° out of phase with respect to the alternating signal supplied to the adding network 101 by the $V_A$ signal channel.

The $V_C$ signal channel operates in the same manner as the lower or $V_A$ signal channel. In particular, under the control of function former diodes 98 and 100, the cathode follower portion of this upper channel serves to adjust the amplitude of the alternating component of the chopped $V_C$ signal in accordance with the $V_C$ signal amplitude appearing at input terminals 64. The resulting alternating-signal component appearing at the output of the diode network 99 is then coupled by a condenser 104 to the third input terminal of the resistor adding network 101. This alternating signal is in phase with the corresponding $V_A$ alternating signal and, thus, is 180° out of phase with the $V_B$ alternating signal.

Resistor adding network 101 performs two functions, namely, to weight the three signals and to combine the three signals to produce the desired resultant signal. If it is assumed that the cathode follower stages in each of the three signal channels treat the three signals in exactly the same manner when the function former diodes 83, 90, 98 and 100 are non-conductive, then the adding network 101 provides the initial relative weighting of the three signals. To this end, resistor $R_b$ is made to satisfy the condition that:

$$R_b \gg (R_0 + r_0) \tag{4}$$

This causes the $V_B$ alternating current flowing through resistors $R_0$ and $r_0$ to be proportional to the $V_B$ voltage. Resistors $R_a$ and $R_c$, on the other hand, are made to satisfy the condition:

$$R_a = R_c = 2R_b \tag{5}$$

Consequently, the $V_A$ and $V_C$ alternating currents flowing through resistor $r_0$ will likewise be proportional to the respective $V_A$ and $V_C$ voltages, except that for the same voltage value at their adding network inputs these currents will be of one-half the value of the $V_B$ current.

Resistors $R_0$ and $r_0$ are chosen to establish the initial weighting factor $\theta_B$ for the center signal channel. In particular:

$$\theta_B = \frac{R_0 + R_0}{R_0} = 1 + \frac{r_0}{R_0} \tag{6}$$

where the voltage drop across resistor $R_0$ is taken as representing a signal of unity weight. The values of the other adding network voltages are referenced to this $R_0$ value to obtain their relative weights. Equation 6 may be rewritten as:

$$r_0 = (\theta_B - 1)R_0 \tag{7}$$

to show the relationship between the weighting factor $\theta_B$ and the value of resistor $r_0$.

As indicated by Equation 3, for the case where $\theta_A$ is equal to $\theta_C$, the desired relationship between $\theta_A$, $\theta_C$ and $\theta_B$ is:

$$\theta_A = \theta_C = \tfrac{1}{2}(\theta_B - 1) \tag{8}$$

This desired relationship is provided by resistor $r_0$ because, in terms of resistances, the adding network causes:

$$\theta_A = \theta_C = \tfrac{1}{2}\frac{r_0}{R_0} \tag{9}$$

The factor of one-half arises from the fact that resistors $R_a$ and $R_c$ are twice the value of resistor $R_b$. Inserting the value of the ratio of $r_0$ to $R_0$ given by Equation 7 into Equation 9 shows that the adding network 101 satisfies the conditions of Equation 8.

With the adding network 101 constructed in this manner, there appears at the common output junction 105 alternating-current voltage components corresponding to $\theta_A$ times $V_A$, $\theta_B$ times $V_B$ and $\theta_C$ times $V_C$. Because of the polarity reverseal provided by the relative connections of the input choppers 65, 66 and 67, the VB components is 180° out of phase with respect to the $V_A$ and $V_C$ components. Consequently, the net alternating-current component at the output junction 105 satisfies the relationship of Equation 1, except that all of the polarity signs are reversed. This resulting alternating-current signal is then translated by the cathode follower circuit associated with tube 106 and rectified by the output chopper 108 to provide the desired direct-current output signal $V_r'$ which, in this case, is of negative polarity.

As the $V_A$, $V_B$ and $V_C$ input signals supplied to the input terminals 62, 63 and 64 change their values for changed formation conditions, the weighting factor $\theta_B$ for the $V_B$ signal remains fixed at its initial value. If, however, the $V_A$ signal increases beyond predetermined limits, either one or both of the function former diodes 83 and 90 become conductive to modify the $\theta_A$ weighting factor in the desired manner. The same thing applies to the $V_C$ signal except that in this case it is the diodes 98 and 100 which modify the $\theta_C$ weighting factor. In this manner, the occurrence of undesired over-focussing in the vicinity of bed boundaries having a high conductivity value on one side thereof is greatly minimized, if not altogether eliminated.

Figure 10:
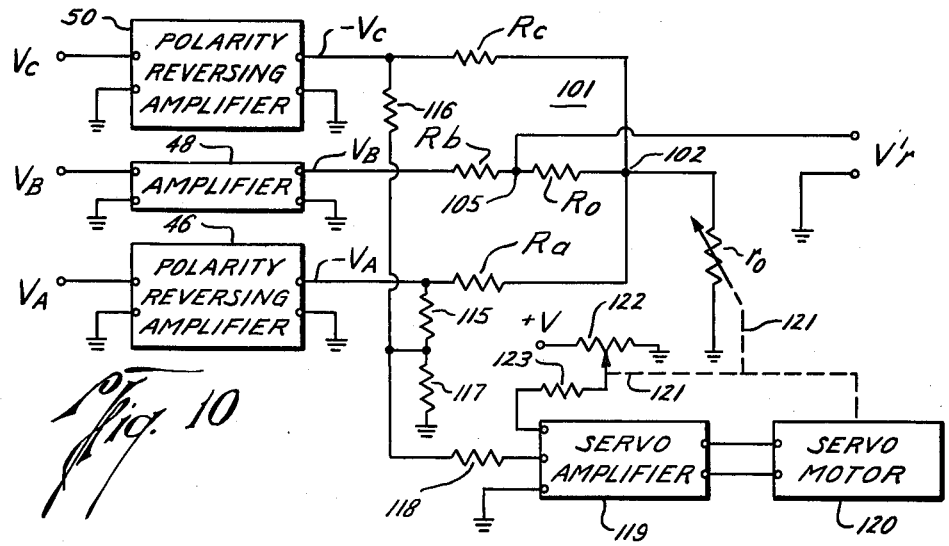
FIG. 10 shows another form of apparatus which may be used in place of a portion of the FIG. 2 apparatus.

Referring now to FIG. 10 of the drawings, there is shown a modified form of weighting and combining means which may be used in place of the computing circuits 31 of FIGS. 1 and 2. The weighting and combining means of FIG. 10 is constructed to simultaneously adjust the weights in all three signal channels in accordance with the average of the two conductivity values seen at the lower and upper computing stations A and C. In this embodiment, the three input signals $V_A$, $V_B$ and $V_C$ are initially supplied to amplifiers corresponding to amplifiers 46, 48 and 50 of FIG. 2 and, hence, designated by the same reference numerals. The output signals from these amplifiers 46, 48 and 50 are then supplied to the resistor adding network 101 which is identical in construction to the correspondingly-designated adding network discussed in connection with FIG. 8 except that the common resistor $r_0$ is now of the adjustable or variable type. In this FIG. 10 embodiment, however, there are no function former circuits. The resistor adding network 101 is, instead, used as the means for varying the weighting factors $\theta_A$, $\theta_B$ and $\theta_C$ as well as the means for setting their initial values and combining the weighted signals. This weighting factor adjustment is provided by adjusting the resistance value of the common resistor $r_0$.

To obtain the desired adjustment, the present embodiment includes servo means responsive to the $V_A$ and $V_C$ signals for adjusting the resistor $r_0$ as a function of the average of the amplitude of these two signals. To this end, the present embodiment includes a resistor adding network composed of resistors 115, 116 and 117. Resistors 115 and 116 are connected respectively to the outputs of amplifiers 46 and 50 so as to develop across the common resistor 117 a voltage signal which is proportional to the average of the two $V_A$ and $V_C$ signals. This average signal is then supplied by way of an input resistor 118 to a servo amplifier 119. Servo amplifier 119 drives a servo motor 120 which, as indicated by mechanical linkage 121, serves to adjust the resistance of the resistor $r_0$. The linkage 121 also serves to adjust the tap point on a follow-up potentiometer 122 to adjust the value of an opposite polarity voltage which is fed back to the input of servo amplifier 119 by way of a second input resistor 123. Servo amplifier 119 will thus continue to drive the servo motor 120 until the algebraic sum of the two opposite polarity input signals supplied to the amplifier 119 assumes a value of substantially zero.

In this manner, the resistor $r_0$ in the adding network 101 is adjusted in accordance with the average of the $V_A$ and $V_C$ signals. This adjustment is made to follow the nonlinear characteristic of curve 55 of the FIG. 5 graph by utilizing a correspondingly nonlinear potentiometer for the follow-up potentiometer 122. If desired, the adjustable resistor $r_0$ could instead be made the nonlinear element. In this manner, the apparatus of FIG. 10 serves to adjust the three weighting factors $\theta_A$, $\theta_B$ and $\theta_C$ in accordance with the average of the two outer station readings $V_A$ and $V_C$. These outer readings correspond to the earth regions occupying shoulder positions with respect to the center reading taken at station B.

Figure 11:
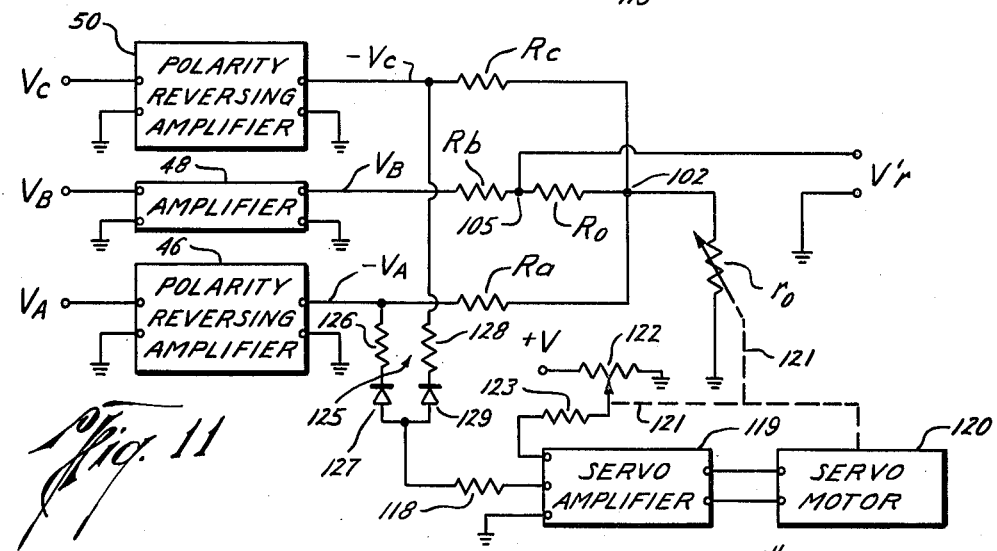
FIG. 11 shows a further form of apparatus which may be used in place of a portion of the FIG. 2 apparatus.

Referring now to FIG. 11 of the drawings, there is shown yet another form of variable-weight computing apparatus constructed in accordance with the present invention. The FIG. 11 apparatus is generally similar to that of FIG. 10 and, hence corresponding elements are designated by the same reference numerals. The FIG. 11 apparatus differs from that of FIG. 10 in that it includes a diode switching circuit 125 for supplying to the servo amplifier 119 only the larger one of the $V_A$ and $V_C$ signals. This diode switching circuit 125 includes a resistor 126 and a diode 127 connected between the output of amplifier 46 and the input resistor 118 of the servo amplifier 119. This switching circuit 125 further includes another resistor 128 and a second diode 129 connected between the output of amplifier 50 and the same input resistor 118.

Assuming that the $V_A$ signal is the larger in amplitude, then the $V_A$ current flowing through the switching diode 127 produces a negative voltage drop across the servo input resistor 118 which is greater than the negative potential supplied to the cathode side of the second diode 129. Consequently, diode 129 remains non-conductive and only the $V_A$ signal is supplied to the input of the servo amplifier 119. If, on the other hand, the $V_C$ signal is the larger one, then diode 127 remains non-conductive as a result of the $V_C$ voltage drop across the resistor 118. Thus, the servo system responds to the larger one of the $V_A$ and $V_C$ signals to adjust the resistor $r_0$ and, consequently, the weighting factors $\theta_A$, $\theta_B$ and $\theta_C$ in the three signal channels. Consequently, in this embodiment, the weighting factors are adjusted in accordance with the highest shoulder conductivity value in the vicinity of the coil system.

Figure 12:
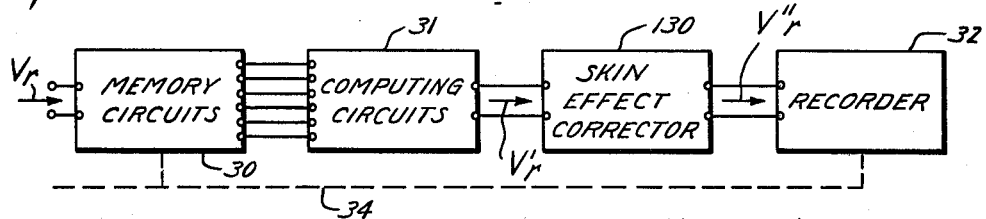
FIG. 12 illustrates a modified form for the surface portion of the apparatus of FIG. 1.

Referring now to FIG. 12 of the drawings, there is shown a modified form of signal processing circuits for the surface portion of the FIG. 1 apparatus. In particular, FIG. 12 shows the use of an additional circuit, namely, a skin effect corrector 130, intermediate the computing circuits 31 and recorder 32. This skin effect corrector 130 serves to further process the computed focus $V_r'$ signal to develop a resultant signal $V_r''$ wherein the background skin effect error occurring in the vicinity of formation regions of relatively high conductivity is minimized. One form which the skin effect corrector 130 may take is described in the above-mentioned Schneider application Serial No. 34,825. Briefly, a nonlinear diode-type function former is utilized to adjust the amplitude of the computed $V_r'$ signal as a function of such amplitude and, consequently, as a function of the apparent formation conductivity indicated thereby. This skin effect corrector 130 may be used with any of the embodiments of computing apparatus hereinbefore or hereinafter discussed.

Referring now to FIG. 13 of the drawings, there is shown a further form of variable-weight computing apparatus which may be used in place of the computing circuits 31 of FIG. 2. In the computing circuits 31 of FIG. 2, each of the weighting factors $\theta_A$, $\theta_B$ and $\theta_C$ is varied independently of the other in accordance with the apparent conductivity seen at the corresponding one of the computing stations A, B and C. In some cases, further advantages can be realized with this same general form of apparatus if some of the weighting factors are instead made to be dependent on two or more of the computing station signals. The FIG. 13 computing apparatus represents apparatus of this latter type.

The FIG. 13 computing apparatus is constructed to provide a resultant output signal $V_r'$ in accordance with the expression:

$$V_r' = \theta_A(V_B - V_A) + V_B + \theta_C(V_B - V_C) \quad (10)$$

where $\theta_A$ and $\theta_C$ represents signal weighting factors and $V_A$, $V_B$ and $V_C$ represent the three signals supplied to the three inputs of the computing apparatus at any given instant. The first factor in Equation 10 is obtained by supplying both the $V_A$ and $V_B$ signals to a differential amplifier 46a. The output of this amplifier 46a then corresponds to the difference between $V_B$ and $V_A$. This difference signal is then supplied to a function former 47a which serves to apply the weighting factor $\theta_A$ thereto. The resulting weighted signal is then supplied to the adding circuit 52. The second factor of Equation 10 is obtained by supplying the $V_B$ signal to the adding circuit 52 by way of an amplifier 48. The third factor of Equation 10 is obtained by supplying both the $V_B$ and $V_C$ signals to a differential amplifier 50a. The output of this amplifier 50a, which corresponds to the difference between the $V_B$ and $V_C$ signals, is then supplied to a function former 51a. Function former 51a serves to apply the weighting factor $\theta_C$ to this difference signal, the weighted difference signal then being supplied to the adding circuit 52. Adding circuit 52 serves to combine the three quantities supplied thereto to provide the resultant output signal $V_R'$ in accordance wtih the relationship of Equation 10.

This unmodified $V_B$ signal supplied by way of the amplifier 48 can be thought of as the primary signal, while the weighted difference signals supplied by way of function formers 47a and 51a can be thought of as being in the nature of correction signals which are applied to the primary signal whenever necessary to provide good vertical focussing. An advantage of this form of apparatus can be seen by considering the case where the coil system is traversing a homogeneous formation region having a vertical thickness appreciably greater than the distance between the uppermost and lowermost computing stations. In this case, the three computing station signals become equal to one another. In other words:

$$V_A = V_B = V_C \tag{11}$$

In this case, the difference signal or correction factor terms of Equation 10 become zero and:

$$V_r' = V_B \tag{12}$$

This means that, in this case, the output signal supplied to the recorder by the computing apparatus is the same as the signal which would be supplied to such recorder if no computing apparatus had been utilized. Consequently, any inaccuracies or drift errors which may occur in the operation of the computing apparatus will not affect the resultant output signal for the case of vertical intervals of extended thickness. In particular, any second order errors introduced by using a finite number of function forming diodes in the function formers 47a and 51a or any errors caused by temperature drifts in these function formers will be of no concern over such extended vertical intervals. For many boreholes, such extended vertical intervals will represent an appreciable portion of the total length of such boreholes. Also, because the weighted difference signals are in the nature of correction signals applied to a primary signal, any errors in such difference signals for the case of vertical intervals of relatively small thickness will have a reduced effect on the resultant output signal.

Note also that Equation 10 can be rewritten as:

$$V_r' = -\theta_A V_A + (\theta_A + 1 + \theta_C) V_B - \theta_C V_C \tag{13}$$

In other words, there is applied to the $V_B$ signal an effective weighting factor of:

$$\theta_B = (\theta_A + 1 + \theta_C) \tag{14}$$

Inserting $\theta_B$ into Equation 13 shows that this equation is the same as Equation 1, the basic computer equation previously considered. Also, Equation 14 corresponds to Equation 3 so that the algebraic sum of the weights is always equal to unity, even though the individual weighting factors are varying as functions of the formation conductivity.

From the foregoing descriptions of the various embodiments of the present invention, it is seen that borehole logging apparatus constructed in accordance with this invention enables the benefits of computed focussing to be obtained, particularly under extreme formation conditions, without introducing undesired over-focussing effects. The present invention also provides computed focussing apparatus which is less sensitive to variations in bed thickness.

While the present invention has been described for a specific coil system and a specific number of computing stations, i.e., number of borehole depths considered at each instant, it is apparent that the present invention may be used with other forms of coil systems or other forms of logging systems which employ either the same or a different number of computing stations.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. Apparatus for use with a borehole logging system wherein a sensing system is moved through the borehole to develop signals representative of a characteristic of the adjacent formation material at different depths in the borehole, the apparatus comprising: means for translating these signals obtained at different borehole depths including means for applying different weighing factors to at least two of these signals during such translation and means for varying at least one of these weighting factors as a function of the formation characteristic in the vicinity of at least one of the depths corresponding to one of the signals being translated; and means for combining these translated signals to develop a resultant signal providing an improved indication of the desired formation characteristic.

2. Apparatus for use with a borehole logging system wherein a sensing system is moved through the borehole to develop signals representative of a characteristic of the adjacent formation material at different depths in the borehole, The apparatus comprising: means for translating these signals obtained at different borehole depths including means for applying different weighting factors to a plurality of these signals during such translation and means for varying a plurality of these weighting factors as a function of at least one of the signals being translated; and means for combining these translated signals to develop a resultant signal providing an improved indication of the desired formation characteristic.

3. Apparatus for use with a borehole logging system wherein a sensing system is moved through the borehole to develop signals representative of a characteristic of the adjacent formation material at different depths in the borehole, the apparatus comprising: means for weighting and combining these signals obtained at different borehole depths, different weighting factors being applied to at least two of these signals; means for varying at least one of these weighting factors as a function of the formation characteristic in the vicinity of at least one of the depths corresponding to one of the signals being weighted; and means for providing an indication of the resulting combined signal.

4. Apparatus for use with a borehole logging system wherein a sensing system is moved through the borehole to develop signals representative of a characteristic of the adjacent formation material at different depths in the borehole, the apparatus comprising: a plurality of signal channels for translating these signals obtained at different bore hole depths, at least all but one of these channels including signal delay means for producing at the output ends of the different channels simultaneous occurrence of signal portions corresponding to different depths in the borehole; means for applying weighting factors to the signals translated by at least two of these channels; means for varying at least one of these weighting factors as a function of the formation characteristic in the vicinity of at least one of the depths corresponding to one of the signals being weighted; and means for combining the translated signals to develop resultant signals providing improved indications of the desired formation characteristic.

5. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; a plurality of signal channels for translating these signals, at least all but one of these channels including signal delay means for producing at the output ends of the different channels simultaneous occurrence of signal portions corresponding to different depths in the borehole; means for applying weighting factors to the signals translated by at least two of these channels; means for varying at least one of these weighting factors as a function of the formation characteristic in the vicinity of at least one of the depths corresponding to one of the signals being weighted; and means for combining the translated signals to develop resultant signals providing improved indications of the desired formation characteristic.

6. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; a plurality of signal channels for translating these signals, at least all but one of these channels including signal delay means for producing at the output ends of the different channels simultaneous occurence of signal portions corresponding to different depths in the borehole; means for applying weighting factors to the signals translated by these channels; means for varying at least one of these weighting factors as a function of the signal being translated by the respective channel; and means for combining the translated signals to develop resultant signals providing improved indications of the desired formation characteristic.

7. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; a plurality of signal channels for translating these signals, at least all but one of these channels including signal delay means for producing at the output ends of the different channels simultaneous occurrence of signal portions corresponding to different depths in the borehole; means for applying weighting factors to the signals translated by these channels; means for varying at least one of these weighting factors as a function of the amplitude of the signal being translated by the respective channel; and means for combining the translated signals to develop resultant signals providing improved indications of the desired formation characteristic.

8. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; a plurality of signal channels for translating these signals, at least all but one of these channels including signal delay means for producing at the output ends of the different channels simultaneous occurrence of signal portions corresponding to different depths in the borehole, each of these channels also including means for applying weighting factors to their respective signals, and a plurality of these channels further including means for varying their respective weighting factors as functions of their respective signals; and means for combining the translated signals to develop resultant signals providing improved indications of the desired formation characteristic.

9. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; a plurality of signal channels for translating these signals, at least all but one of these channels including signal delay means for producing at the output ends of the different channels simultaneous occurrence of signal portions corresponding to different depths in the borehole; means for applying weighting factors to the signals translated by these channels, at least one of these weighting means including nonlinear means for varying its weighting factor as a function of the amplitude of the signal supplied to its channel; and means for combining the translated signals to develop resultant signals providing improved indications of the desired formation characteristic.

10. In apparatus for investigating earth formations traversed by a borehole, the combination comprising: sensing means adapted for movement through the borehole for developing a signal representative of a characteristic of the adjacent formation material; means for moving the sensing means through the borehole for developing signals representative of the formation material at different depths in the borehole; at least three signal channels for translating these signals, at least two of these channels including signal delay means for producing at the output ends of the different channels simultaneous occurrence of signal portions corresponding to different depths in the borehole; means for applying weighting factors to the signals translated by these channels; means for varying at least two of these weighting factors as functions of the signals supplied to their respective channels; and means for combining the translated signals to develop resultant signals providing improved indications of the desired formation characteristic.

11. In apparatus for investigating earth formations traversed by a borehole, the combination comprising: a coil system adapted for movement through the borehole; means for energizing the coil system with alternating current for developing a signal representative of the electrical conductivity of the adjacent formation material; means for moving the coil system through the borehole for developing signals representative of the formation conductivity at different depths in the borehole; a plurality of signal channels for translating these signals, at least all but one of these channels including signal delay means for producing at the output ends of the different channels simultaneous occurrence of signal portions corresponding to different depths in the borehole; means for applying different weighting factors to the signals translated by at least two of these channels; means for varying at least one of these weighting factors as a function of the formation conductivity in the vicinity of at least one of the depths corresponding to one of the signals being weighted; and means for combining the translated signals to develop resultant signals providing improved indications of the formation conductivity variations.

12. In apparatus for investigating earth formations traversed by a borehole, the combination comprising: a coil system adapted for movement through the borehole; means for energizing the coil system with alternating current for developing a signal representative of the electrical conductivity of the adjacent formation material; means for moving the coil system through the borehole for developing signals representative of the formation conductivity at different depths in the borehole; at least three signal channels for translating these signals, at least two of these channels including signal delay means for producing at the output ends of the different channels simultaneous occurrence of signal portions corresponding to different depths in the borehole; means for applying weighting factors to the signals translated by these channels; means for varying at least two of these weighting factors as nonlinear functions of the amplitudes of the signals supplied to their respective channels; and means for combining the translated signals to develop resultant signals providing improved indications of the formation conductivity variations.

13. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at different memory circuit output terminals the simultaneous occurrence of signal portions corresponding to different depths in the borehole; means for combining a plurality of signals; a plurality of signal translating means coupling a plurality of the memory circuit output terminals to the signal combining means, at least two of these signal translating means including means for applying weighting factors to their respective signals; means for varying at least one of these weighting factors as a function of the formation electrical characteristic in the vicinity of at least one of the depths corresponding to one of the signals being translated; and means for providing indications of the resultant signals developed by the signal combining means.

14. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at three memory circuit output terminals the simultaneous occurrence of three signals, $V_A$, $V_B$ and $V_C$, corresponding at any given instant to three different depths in the borehole, the $V_B$ signal, corresponding to a depth intermediate the depths of the $V_A$ and $V_C$ signals; three signal translating means individually coupled to the memory circuit output terminals for applying weighting factors $-\theta_A$, $+\theta_B$ and $-\theta_C$ the corresponding signals; circuit means for algebraically adding the weighted signals for developing a resultant output signal $V_r'$ described by the relationship $$V_r' = -\theta_A V_A + \theta_B V_B - \theta_C V_C$$

means for varying at least one of the weighting factors as a function of the formation electrical characteristic in the vicinity of at least one of the $V_A$ and $V_C$ signal depths; and means for providing indications of the resultant $V_r'$ signal developed by the adding circuit means.

15. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at different memory circuit output terminals the simultaneous occurrence of signal portions corresponding to different depths in the borehole; means for combining a plurality of signals; a plurality of signal translating means coupling a plurality of the memory circuit output terminals to the signal combining means, at least two of these signal translating means including nonlinear function former circuit means for applying weighting factors to their respective signals and for varying these weighting factors as functions of the amplitudes of the signals supplied thereto; and means for providing indications of the resultant signals developed by the signal combining means.

16. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at three memory circuit output terminals the simultaneous occurrence of three signals, $V_A$, $V_B$ and $V_C$, corresponding at any given instant to three different depths in the borehole; three signal translating means individually coupled to the memory circuit output terminals and individually including nonlinear function former circuit means for applying weighting factors $-\theta_A$, $+\theta_B$ and $-\theta_C$ to the respective signals and for varying the weighting factors as functions of the respective signal amplitudes, polarity reversing means being included in appropriate ones of these signal translating means for obtaining the indicated relative polarities, circuit means for algebraically adding the weighted signals; and means for providing indications of the resultant signals developed by the adding circuit means.

17. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at three memory circuit output terminals the simultaneous occurrence of three signals, $V_A$, $V_B$ and $V_C$, corresponding at any given instant to three different depths in the borehole the $V_B$ signal corresponding to a depth intermediate the depths of the $V_A$ and $V_C$ signals; a resistor adding network for weighting and combining three signals and having three input terminals and a common output terminal; three signal translating means individually coupling one of the memory circuit output terminals to one of the adding network input terminals, the signal translating means for the $V_A$ and $V_C$ signals each including a nonlinear function former circuit for modifying the amplitude of the corresponding signal as a function of such amplitude; and means for providing indications of the resultant signal appearing at the adding network output terminal.

18. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at three different memory circuit output terminals the simultaneous occurrence of signal portions corresponding at any given instant to three different depths in the borehole; means for combining signals; three signal translating means coupling the memory circuit output terminals to the signal combining means, at least two of these signal translating means including means for applying weighting factors to their respective signals; means for varying these weighting factors as a function of the average of the two signal values corresponding to the uppermost and lowermost borehole depths being considered at that instant; and means for providing indications of the resultant signal developed by the signal combining means.

19. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at three different memory circuit output terminals the simultaneous occurrence of signal portions corresponding at any given instant to three different depths in the borehole; means for combining signals; three signal translating means coupling the memory circuit output terminals to the signal combining means, at least two of these signal translating means including means for applying weighting factors to their respective signals; means for varying these weighting factors as a function of the largest one of the two signals corresponding to the uppermost and lowermost borehole depths being considered at that instant; and means for providing indications of the resultant signal developed by the signal combining means.

20. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at different memory circuit output terminals the simultaneous occurrence of signal portions corresponding to different depths in the borehole; a resistor adding network having separate input branches and a common output branch for weighting and combining signals supplied to the input branches; a plurality of signal translating means individually coupling one of the memory circuit output terminals to one of the adding network input branches; servo means responsive to at least one of the memory circuit output signals for adjusting the resistance in at least one branch of the adding network as a function thereof; and means for providing indications of the resultant signals developed in the output branch of the adding network.

21. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at different memory circuit output terminals the simultaneous occurrence of signal portions corresponding to different depths in the borehole; a resistor adding network having separate input branches and a common output branch for weighting and combining signals supplied to the input branches; a plurality of signal translating means individually coupling one of the memory circuit output terminals to one of the adding network input branches; servo means responsive to at least one of the memory circuit output signals for adjusting the resistance in the common output branch of the adding network as a function thereof; and means for providing indications of the resultant signals developed in the output branch of the adding network.

22. In induction logging apparatus for investigating earth formations traversed by a borehole, the combination comprising: a coil system adapted for movement through the borehole and including at least one transmitter coil and at least one receiver coil; means for energizing the transmitter coil with alternating current for developing receiver coil signals representative of an electrical characteristic of the formations; memory circuit means coupled to the receiver coil and synchronized with the movement of the coil system for producing at different memory circuit output terminals the simultaneous occurrence of signal portions corresponding to different depths in the borehole; a resistor adding network having separate input branches and a common output branch for weighting and combining signals supplied to the input branches; a plurality of signal translating means individually coupling one of the memory circuit output terminals to one of the adding network input branches; servo means for adjusting the resistance in at least one branch of the adding network; diode switching circuit means coupled to two of the memory circuit output terminals for supplying to the input of the servo means the larger of the two corresponding memory circuit output signals; and means for providing indications of the resultant signals developed in the output branch of the adding network.

23. A method of investigating earth formations traversed by a bore hole comprising: measuring a formation characteristic at different depths in the borehole; providing separate indications of these measurements; adjusting at least one of these separate indications as a nonlinear function of the formation characteristic; and combining these separate indications, using in each case the adjusted indication if one is available, to provide an improved resultant indication of the formation characteristic at a single one of the borehole depths.

24. A method of investigating earth formations traversed by a borehole comprising: measuring a formation characteristic at different depths in the borehole; providing separate indications of these measurements; adjusting at least one of these separate indications as a nonlinear function of the value of at least one of these separate indications; and combining these separate indications, using in each case the adjusted indication if one is available, to provide an improved resultant indication of the formation characteristic at a single one of the borehole depths.

25. A method of investigating earth formations traversed by a borehole comprising: measuring a formation characteristic at different depths in the borehole; providing separate indications of these measurements; adjusting at least one of these separate indications as a nonlinear function of the value thereof; and combining these separate indications, using in each case the adjusted indication if one is available, to provide an improved resultant indication of the formation characteristic at a single one of the borehole depths.

26. A method of investigating earth formations traversed by a borehole comprising: measuring a formation characteristic at different depths in the borehole; providing separate indications of these measurements; adjusting at least one of these separate indications as a nonlinear function of the value of at least one of these separate indications; combining these separate indications, using in each case the adjusted indication if one is available; and recording the combined indication as the value of the formation characteristic at a single one of the borehole depths.

27. A method of investigating earth formations traversed by a bore hole comprising: measuring a formation characteristic at different depths in the borehole; providing separate indications of these measurements; adjusting at least two of these separate indications in accordance with different nonlinear functions of the formation characteristic; and combining these separate indications, using in each case the adjusted indication if one is available, to provide an improved resultant indication of the formation characteristic at a single one of the borehole depths.

28. A method of investigating earth formations traversed by a borehole comprising: measuring a formation characteristic at different depths in the borehole; providing separate indications of these measurements; adjusting at least two of these separate indications in accordance with different nonlinear functions of their respective values; combining these separate indications, using in each case the adjusted indication if one is available; and recording the combined indication as the value of the formation characteristic at a single one of the borehole depths.

(References on following page)

References Cited by the Examiner

UNITED STATES PATENTS

| | | | |
|---|---|---|---|
| 2,436,503 | 2/1948 | Cleveland | 340—18 X |
| 2,728,047 | 12/1955 | Doll | 324—1 |
| 2,770,771 | 11/1956 | Schuster | 324—1 |
| 2,790,138 | 4/1957 | Poupon | 324—6 |
| 2,869,785 | 1/1959 | Adams | 235—172 |
| 2,878,999 | 3/1959 | Lindsey et al. | 235—151 |
| 2,912,164 | 11/1959 | Seevers | 235—193 |
| 2,915,246 | 12/1959 | Piety | 235—180 |
| 2,948,846 | 8/1960 | Coufleau | 324—6 |

WALTER L. CARLSON, *Primary Examiner.*

SAMUEL BERNSTEIN, *Examiner.*

UNITED STATES PATENT OFFICE
CERTIFICATE OF CORRECTION

Patent No. 3,230,445                                  January 18, 1966

William J. Sloughter et al.

It is hereby certified that error appears in the above numbered patent requiring correction and that the said Letters Patent should read as corrected below.

Column 3, line 23, for "way" read -- ways --; column 6, line 59, for "characteristics" read -- characteristic --; column 8, line 1, for "deducted" read -- deduced --; line 15, for "interms" read -- in terms --; column 11, line 49, for "largly" read -- largely --; line 57, for "ocurrence" read -- occurrence --; column 12, line 11, for "spuriors" read -- spurious --; line 54, for "milllimho" read -- millimho --; line 58, for "erron" read -- error --; column 17, line 20, for "of" read -- for --; line 37, for "appeaing" read -- appearing --; column 18, line 27, for "valve" read -- value --; lines 56 and 57, for "terminal" read -- terminals --; column 20, lines 4 to 6, for that portion of equation (6) reading "$R_0+R_0$" read -- $R_0+r_0$ --; line 34, for "reverseal" read -- reversal --; column 22, line 25, for "$\theta_0$" read -- $\theta_C$ --; column 23, line 70, for "weighing" read -- weighting --; column 24, line 8, for "The" read -- the --; same column 24, line 36, and column 30, line 52, for "bore hole", each occurrence, read -- borehole --.

Signed and sealed this 1st day of August 1967.

(SEAL)
Attest:

EDWARD M. FLETCHER, JR.
Attesting Officer

EDWARD J. BRENNER
Commissioner of Patents